(12) United States Patent
Gao et al.

(10) Patent No.: US 12,177,042 B2
(45) Date of Patent: Dec. 24, 2024

(54) COMMUNICATION METHOD AND APPARATUS

(71) Applicant: HUAWEI TECHNOLOGIES CO., LTD., Guangdong (CN)

(72) Inventors: Xinyu Gao, Beijing (CN); Kunpeng Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/192,032

(22) Filed: Mar. 29, 2023

(65) Prior Publication Data
US 2023/0231742 A1 Jul. 20, 2023

Related U.S. Application Data

(63) Continuation of application No. PCT/CN2021/119116, filed on Sep. 17, 2021.

(30) Foreign Application Priority Data

Sep. 30, 2020 (CN) .......................... 202011063776.X

(51) Int. Cl.
*H04W 72/1268* (2023.01)
*H04L 5/00* (2006.01)
*H04L 25/02* (2006.01)

(52) U.S. Cl.
CPC ........ *H04L 25/0202* (2013.01); *H04L 5/0048* (2013.01); *H04W 72/1268* (2013.01)

(58) Field of Classification Search
CPC . H04L 25/022; H04L 5/0048; H04W 72/1268
See application file for complete search history.

(56) References Cited

U.S. PATENT DOCUMENTS

2018/0062811 A1* 3/2018 Akkarakaran ........ H04L 5/0007
2020/0052757 A1 2/2020 Wang et al.

FOREIGN PATENT DOCUMENTS

| CN | 106953672 A | 7/2017 |
|---|---|---|
| CN | 111342913 A | 6/2020 |
| CN | 111356171 A | 6/2020 |
| EP | 3886347 A1 | 9/2021 |
| WO | 2020125511 A1 | 6/2020 |

OTHER PUBLICATIONS

Huawei, HiSilicon, Enhancements on CSI for Rel-17. 3GPP TSG RAN WG1 Meeting #102-e, E-meeting, Aug. 17, 28, 2020, R1-2005248, 16 pages.

* cited by examiner

*Primary Examiner* — Rahel Guarino
(74) *Attorney, Agent, or Firm* — WOMBLE BOND DICKINSON (US) LLP

(57) ABSTRACT

This application provides a communication method and apparatus, so that a terminal device sends uplink pilot signals, the terminal device obtains a first delay information set based on downlink pilot signals from a network device, and the network device jointly considers the first delay information set and the uplink pilot signals to perform uplink channel estimation. The first delay information set may indicate a delay position of a strong path, and uplink channel estimation accuracy can be improved.

18 Claims, 6 Drawing Sheets

COMMUNICATION METHOD AND APPARATUS

CROSS-REFERENCE TO RELATED APPLICATION

This application is a continuation of International Application No. PCT/CN2021/119116, filed on Sep. 17, 2021, which claims priority to Chinese Patent Application No. 202011063776.X, filed on Sep. 30, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

In a time division duplex (TDD) multiple input multiple output (MIMO) technology, a base station estimates uplink channel information by receiving sounding reference signals (SRSs) sent by a user, then obtains downlink channel information by using TDD uplink-downlink channel reciprocity, and designs corresponding precoding for downlink data transmission.

Currently, because an uplink transmit power is low, interference is strong, and a signal to interference plus noise ratio of the SRS is usually quite low (<0 decibels (dB)), uplink channel estimation accuracy needs to be improved.

SUMMARY

This application provides a communication method and apparatus, to improve uplink channel estimation accuracy.

Embodiments of this application provide the communication method and apparatus, to more flexibly disable downlink channel sounding.

According to a first aspect, a communication method is provided. The method may be performed by a first communication apparatus. The first communication apparatus may be a communication device or a communication apparatus that can support a function needed by the communication device to implement the method, for example, a chip. For example, the first communication apparatus is a terminal device, a chip disposed in the terminal device and configured to implement a function of the terminal device, or another component configured to implement the function of the terminal device. In the following description process, an example in which the first communication apparatus is the terminal device is used for description.

The method includes: The terminal device sends uplink pilot signals to a network device. The terminal device receives downlink pilot signals from the network device, and determines a first delay information set based on the downlink pilot signals, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The terminal device may further send the first delay information set to the network device. In an embodiment, the first delay information set is for uplink channel estimation.

According to the method, the terminal device may send the uplink pilot signals, the terminal device obtains the first delay information set based on the downlink pilot signals from the network device, and the network device jointly considers the first delay information set and the uplink pilot signals to perform uplink channel estimation, so that uplink channel estimation accuracy can be improved.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the terminal device may receive second delay information from the network device, where the second delay information indicates: a quantity T of paths of an uplink channel between K' send ports of the terminal device and M' receive ports of the network device, where T is a positive integer; and/or a delay position of each of the T paths of the uplink channel between the K' send ports of the terminal device and the M' receive ports of the network device. In this case, a processing module may determine the first delay information set based on the downlink pilot signals and the second delay information. Therefore, the first delay information set is determined more efficiently.

In an embodiment, the delay positions of the $N_p$ paths in the $p^{th}$ piece of first delay information is a subset of the delay positions of the T paths, $N_p \leq T$, and the $p^{th}$ piece of first delay information indicates indexes of the delay positions of the $N_p$ paths in the delay positions of the T paths, to reduce overheads.

In an embodiment, the terminal device receives first information from the network device, where the first information indicates frequency domain positions of the downlink pilot signals, and the frequency domain positions of the downlink pilot signals are distributed at unequal intervals, so that uplink channel estimation accuracy can be further improved.

In an embodiment, the terminal device determines frequency domain positions of the downlink pilot signals based on the second delay information.

In an embodiment, the terminal device may receive second information from the network device, where the second information indicates the terminal device to send the first delay information set.

In an embodiment, the second information further indicates the terminal device to receive the second delay information.

According to a second aspect, a communication method is provided. The method may be performed by a second communication apparatus. The second communication apparatus may be a communication device or a communication apparatus that can support a function needed by the communication device to implement the method, for example, a chip. For example, the second communication apparatus is a network device (for example, a base station), a chip disposed in the network device and configured to implement a function of the network device, or another component configured to implement the function of the network device. In the following description process, an example in which the second communication apparatus is the network device is used for description.

The method includes: A network device receives uplink pilot signals from a terminal device. The network device sends downlink pilot signals to the terminal device, and receives a first delay information set from the terminal device, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The network device determines an uplink channel between K' send ports of the terminal device and M' receive ports of the network device based on the first delay information set and the uplink pilot signals.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the network device sends second delay information to the terminal device, where the second delay information indicates: a quantity r of paths of the uplink channel between the K' send ports of the terminal device and the M' receive ports of the network device, where T is a positive integer; and/or a delay position of each of the T paths of the uplink channel between the K' send ports of the terminal device and the M' receive ports of the network device.

In an embodiment, the delay positions of the $N_p$ paths in the $p^{th}$ piece of first delay information is a subset of the delay positions of the T paths, $N_p \leq T$ and the $p^{th}$ piece of first delay information indicates indexes of the delay positions of the $N_p$ paths in the delay positions of the T paths.

In an embodiment, the network device sends first information to the terminal device, where the first information indicates frequency domain positions of the downlink pilot signals, and the frequency domain positions of the downlink pilot signals are distributed at unequal intervals.

In an embodiment, the network device sends second information to the terminal device, where the second information indicates the terminal device to send the first delay information set.

In an embodiment, the second signaling further indicates the terminal device to receive the second delay information.

For beneficial effects of the method shown in the second aspect and the possible designs of the second aspect, refer to the beneficial effects in the first aspect and the possible designs of the first aspect.

According to a third aspect, a communication method is provided. The method may be performed by a first communication apparatus. The first communication apparatus may be a communication device or a communication apparatus that can support a function needed by the communication device to implement the method, for example, a chip. For example, the first communication apparatus is a terminal device, a chip disposed in the terminal device and configured to implement a function of the terminal device, or another component configured to implement the function of the terminal device. In the following description process, an example in which the first communication apparatus is the terminal device is used for description.

The method includes: A terminal device sends uplink pilot signals of a first component carrier to a network device. The terminal device receives, from the network device, downlink pilot signals of a second component carrier to an $F^{th}$ component carrier, where F is a positive integer greater than or equal to 2, and the first component carrier is one of the second component carrier to the $F^{th}$ component carrier. The terminal device determines third delay information based on the downlink pilot signals, where the third delay information is related to a downlink channel that is between M send ports of the network device and K receive ports of the terminal device and that is on the second component carrier to the F to component carrier, and the third delay information indicates: a quantity $R_1$ of paths of the downlink channel, where $R_1$ is a positive integer; and/or a delay position of each of the $R_1$ paths of the downlink channel. The terminal device sends the third delay information to the network device.

According to the foregoing method, the network device may more accurately estimate an uplink channel on the second component carrier to the $F^{th}$ component carrier based on an SRS on the first component carrier, where the first component carrier is one of the second component carrier to the $F^{th}$ component carrier, to improve transmission performance.

In an embodiment, the terminal device may determine the third delay information based on the uplink pilot signals and the downlink pilot signals.

In an embodiment, the terminal device may determine $R^2$ delay positions of the downlink channel based on the downlink pilot signals of the second component carrier to the $F^{th}$ component carrier, where $R_2$ is a positive integer greater than or equal to $R_1$. The terminal device selects the $R_1$ delay positions from the $R_2$ delay positions of the downlink channel based on a position of a frequency domain resource for sending the uplink pilot signals of the first component carrier. The terminal device determines the third delay information based on the $R_1$ delay positions. According to this design, estimation accuracy can be further improved.

In an embodiment, the third delay information is carried by using downlink channel state information.

In an embodiment, the terminal device may receive fourth information from the network device, where the fourth information indicates the terminal device to send the third delay information to the network device.

According to a fourth aspect, a communication method is provided. The method may be performed by a second communication apparatus. The second communication apparatus may be a communication device or a communication apparatus that can support a function needed by the communication device to implement the method, for example, a chip. For example, the second communication apparatus is a network device (for example, a base station), a chip disposed in the network device and configured to implement a function of the network device, or another component configured to implement the function of the network device. In the following description process, an example in which the second communication apparatus is the network device is used for description.

The method includes: A network device receives, from a terminal device, uplink pilot signals of a first component carrier. The network device sends, to the terminal device, downlink pilot signals of a second component carrier to an $F^{th}$ component carrier, where F is a positive integer greater than or equal to 2, and the first component carrier is one of the second component carrier to the $F^{th}$ component carrier. The network device receives third delay information from the terminal device, where the third delay information is determined based on the downlink pilot signals, the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The network device determines, based on the third delay information and the uplink pilot signals, an uplink channel that is between K' send ports of the terminal device and M' receive ports of the network device and that is on the second component carrier to the $F^{th}$ component carrier.

In an embodiment, the third delay information is carried by using downlink channel state information.

In an embodiment, the network device sends fourth information to the terminal device, where the fourth information indicates the terminal device to send the third delay information to the network device.

For beneficial effects of the method shown in the fourth aspect and the possible designs of the fourth aspect, refer to the beneficial effects in the third aspect and the possible designs of the third aspect.

According to a fifth aspect, a communication apparatus is provided. For example, the communication apparatus is the foregoing first communication apparatus. The first communication apparatus is configured to perform the method in the first aspect, the third aspect, or any possible implementation thereof. For example, the first communication apparatus may include modules configured to perform the method in the first aspect, the third aspect, or any possible implementation thereof, for example, include a processing module and a transceiver module. For example, the transceiver module may include a sending module and a receiving module. The sending module and the receiving module may be different function modules, or may be a same function module that can implement different functions. For example, the first communication apparatus is a communication device, or is a chip or another component disposed in the communication device. For example, the communication device is a terminal device. The following uses an example in which the first communication apparatus is the terminal device. For example, the transceiver module may be implemented by using a transceiver, and the processing module may be implemented by using a processor. Alternatively, the sending module may be implemented by using a transmitter, and the receiving module may be implemented by using a receiver. The transmitter and the receiver may be different function modules, or may be a same function module that can implement different functions. If the first communication apparatus is the communication device, the transceiver is implemented, for example, by using an antenna, a feeder, and a codec in the communication device. Alternatively, if the first communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. In a description process of the fifth aspect, that the first communication apparatus is the terminal device, the processing module, and the transceiver module are still used as an example for description.

When the method shown in the first aspect is performed, the transceiver module may be configured to send uplink pilot signals to a network device, and receive downlink pilot signals from the network device. The processing module may be configured to determine a first delay information set based on the downlink pilot signals, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The transceiver module may further send the first delay information set to the network device. In an embodiment, the first delay information set is for uplink channel estimation.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the transceiver module may further receive second delay information from the network device, where the second delay information indicates: a quantity T of paths of an uplink channel between K' send ports of the terminal device and M' receive ports of the network device, where T is a positive integer; and/or a delay position of each of the T paths of the uplink channel between the K' send ports of the terminal device and the M' receive ports of the network device. In this case, the processing module may determine the first delay information set based on the downlink pilot signals and the second delay information. Therefore, the first delay information set is determined more efficiently.

In an embodiment, the delay positions of the $N_p$ paths in the $p^{th}$ piece of first delay information is a subset of the delay positions of the T paths, $N_p \leq T$ and the $p^{th}$ piece of first delay information indicates indexes of the delay positions of the $N_p$ paths in the delay positions of the T paths, to reduce overheads.

In an embodiment, the transceiver module may further receive first information from the network device, where the first information indicates frequency domain positions of the downlink pilot signals, and the frequency domain positions of the downlink pilot signals are distributed at unequal intervals, so that uplink channel estimation accuracy can be further improved.

In an embodiment, the processing module may be configured to determine frequency domain positions of the downlink pilot signals based on the second delay information.

In an embodiment, the transceiver module may further receive second information from the network device, where the second information indicates the terminal device to send the first delay information set.

In an embodiment, the second information further indicates the terminal device to receive the second delay information.

When the method shown in the first aspect is performed, for beneficial effects of the communication apparatus, refer to the beneficial effects in the first aspect and the possible designs of the first aspect.

When the method shown in the third aspect is performed, the transceiver module may send uplink pilot signals of a first component carrier to a network device, and receive, from the network device, downlink pilot signals of a second component carrier to an $F^{th}$ component carrier, where F is a positive integer greater than or equal to 2, and the first component carrier is one of the second component carrier to the $F^{th}$ component carrier. The processing module may determine third delay information based on the downlink pilot signals, where the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The transceiver module may further send the third delay information to the network device.

In an embodiment, the processing module may determine the third delay information based on the uplink pilot signals and the downlink pilot signals.

In an embodiment, the processing module may determine $R_2$ delay positions of the downlink channel based on the downlink pilot signals of the second component carrier to the $F^{th}$ component carrier, where $R_2$ is a positive integer greater than or equal to $R_1$. The processing module may select the $R_1$ delay positions from the $R_2$ delay positions of the downlink channel based on a position of a frequency domain resource for sending the uplink pilot signals of the first component carrier. The processing module may determine the third delay information based on the $R_1$ delay positions. According to this design, estimation accuracy can be further improved.

In an embodiment, the third delay information is carried by using downlink channel state information.

In an embodiment, the transceiver module may further receive fourth information from the network device, where the fourth information indicates the terminal device to send the third delay information to the network device.

When the method shown in the third aspect is performed, for beneficial effects of the communication apparatus, refer to the beneficial effects in the third aspect and the possible designs of the third aspect.

According to a sixth aspect, a communication apparatus is provided. For example, the communication apparatus is the foregoing second communication apparatus. The second communication apparatus is configured to perform the method in the second aspect, the fourth aspect, or any possible implementation thereof. For example, the second communication apparatus may include modules configured to perform the method in the second aspect, the fourth aspect, or any possible implementation thereof, for example, include a processing module and a transceiver module. For example, the transceiver module may include a sending module and a receiving module. The sending module and the receiving module may be different function modules, or may be a same function module that can implement different functions. For example, the second communication apparatus is a communication device, or is a chip or another component disposed in the communication device. For example, the communication device is a network device. The following uses an example in which the second communication apparatus is the network device. For example, the network device is the network device. For example, the transceiver module may alternatively be implemented by using a transceiver, and the processing module may alternatively be implemented by using a processor. Alternatively, the sending module may be implemented by using a transmitter, and the receiving module may be implemented by using a receiver. The transmitter and the receiver may be different function modules, or may be a same function module that can implement different functions. If the second communication apparatus is the communication device, the transceiver is implemented, for example, by using an antenna, a feeder, and a codec in the communication device. Alternatively, if the second communication apparatus is the chip disposed in the communication device, the transceiver (or the transmitter and the receiver) is, for example, a communication interface in the chip. The communication interface is connected to a radio frequency transceiver component in the communication device, to implement information receiving and sending by using the radio frequency transceiver component. In a description process of the sixth aspect, that the second communication apparatus is the network device, the processing module, and the transceiver module are still used as an example for description.

When the method shown in the second aspect is performed, the transceiver module may receive uplink pilot signals from a terminal device, send downlink pilot signals to the terminal device, and receive a first delay information set from the terminal device, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$ ; or a delay position of each of $N_p$ paths of the downlink channel corresponding to the $p^{th}$ piece of first delay information. The processing module may determine an uplink channel between K' send ports of the terminal device and M' receive ports of the network device based on the first delay information set and the uplink pilot signals.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the transceiver module may further send second delay information to the terminal device, where the second delay information indicates: a quantity T of paths of the uplink channel between the K' send ports of the terminal device and the M' receive ports of the network device, where T is a positive integer; and/or a delay position of each of the T paths of the uplink channel between the K' send ports of the terminal device and the M' receive ports of the network device.

In an embodiment, the delay positions of the $N_p$ paths in the $p^{th}$ piece of first delay information is a subset of the delay positions of the T paths, $N_p \leq T$, and the $p^{th}$ piece of first delay information indicates indexes of the delay positions of the $N_p$ paths in the delay positions of the T paths.

In an embodiment, the transceiver module may further send first information to the terminal device, where the first information indicates frequency domain positions of the downlink pilot signals, and the frequency domain positions of the downlink pilot signals are distributed at unequal intervals.

In an embodiment, the transceiver module may further send second information to the terminal device, where the second information indicates the terminal device to send the first delay information set.

In an embodiment, the second signaling further indicates the terminal device to receive the second delay information.

When the method shown in the second aspect is performed, for beneficial effects of the communication apparatus, refer to the beneficial effects in the second aspect and the possible designs of the second aspect.

When the method shown in the fourth aspect is performed, the transceiver module may receive, from a terminal device, uplink pilot signals of a first component carrier, and send, to the terminal device, downlink pilot signals of a second component carrier to an $F^{th}$ component carrier, where F is a positive integer greater than or equal to 2, and the first component carrier is one of the second component carrier to the $F^{th}$ component carrier. The transceiver module may further receive third delay information from the terminal device, where the third delay information is determined based on the downlink pilot signals, the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The processing module may determine, based on the third delay information and the uplink pilot signals, an uplink channel that is between K' send ports of the terminal device and M' receive ports of the network device and that is on the second component carrier to the $F^{th}$ component carrier.

In an embodiment, the third delay information is carried by using downlink channel state information.

In an embodiment, the transceiver module may send fourth information to the terminal device, where the fourth information indicates the terminal device to send the third delay information to the network device.

When the method shown in the fourth aspect is performed, for beneficial effects of the communication apparatus, refer to the beneficial effects in the fourth aspect and the possible designs of the fourth aspect.

According to a seventh aspect, a communication system is provided. The communication system includes the communication apparatus according to the fifth aspect or the communication apparatus according to the sixth aspect.

According to an eighth aspect, a computer-readable storage medium is provided. The computer-readable storage medium is configured to store computer instructions. When the computer instructions are run on a computer, the computer is enabled to perform the method according to any one of the first aspect to the fourth aspect or the possible implementations of the first aspect to the fourth aspect.

According to a ninth aspect, a computer-readable storage medium is provided. The computer-readable storage medium is configured to store computer instructions. When the computer instructions are run on a computer, the computer is enabled to perform the method according to any one of the first aspect to the fourth aspect or the possible implementations of the first aspect to the fourth aspect.

According to a tenth aspect, a computer program product including instructions is provided. The computer program product is configured to store computer instructions. When the computer instructions are run on a computer, the computer is enabled to perform the method according to any one of the first aspect to the fourth aspect or the possible implementations of the first aspect to the fourth aspect.

DESCRIPTION OF EMBODIMENTS

To improve uplink channel estimation accuracy, this application provides a communication method. The following further describes this application in detail with reference to the accompanying drawings. It should be understood that an operation method in the following method embodiments may also be applied to an apparatus embodiment or a system embodiment.

Figure 1:
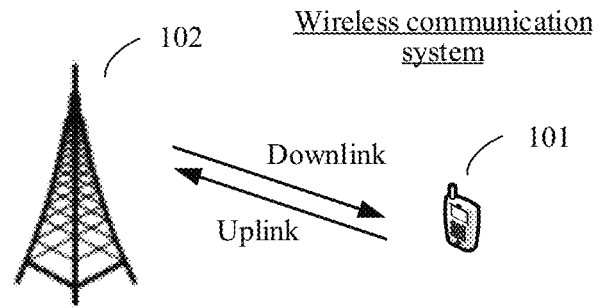
FIG. 1 is a schematic diagram of an architecture of a communication system according to an embodiment of this application.

As shown in FIG. 1, a measurement feedback method provided in embodiments of this application may be applied to a wireless communication system. The wireless communication system may include a terminal device 101 and a network device 102.

It should be understood that the foregoing wireless communication system is applicable to both a low-frequency scenario (sub 6G) and a high-frequency scenario (above 6G). An application scenario of the wireless communication system includes but is not limited to a fifth generation system, a new radio (NR) communication system, a future evolved public land mobile network (PLMN) system, or the like.

The foregoing terminal device 101 may be user equipment (UE), a terminal, an access terminal, a terminal unit, a terminal station, a mobile station (MS), a remote station, a remote terminal, a mobile terminal, a wireless communication device, a terminal agent, a terminal device, or the like. The terminal device 101 may have a wireless transceiver function, can communicate (for example, perform wireless communication) with one or more network devices in one or more communication systems, and accept a network service provided by the network device. The network device herein includes but is not limited to the network device 102 shown in the figure.

The terminal device 101 may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, a terminal apparatus in a future 5G network, a terminal apparatus in a future evolved PLMN, or the like.

In addition, the terminal device 101 may be deployed on land, and includes an indoor or outdoor device, a handheld device, or a vehicle-mounted device. The terminal device 101 may alternatively be deployed on water (for example, on a ship). The terminal device 101 may alternatively be deployed in the air (for example, on an aircraft, a balloon, and a satellite). The terminal device 101 may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, and the like. The terminal device 101 may alternatively be a communication chip having a communication module, or may be a vehicle having a communication function, a vehicle-mounted device (for example, a vehicle-mounted communication apparatus or a vehicle-mounted communication chip), or the like.

The network device 102 may be an access network device (which is also referred to as an access network site). The access network device is a device that has a function of providing network access, for example, a radio access network (RAN) base station. The network device 102 may include a base station (BS), or include the base station, a radio resource management device configured to control the base station, and the like. The network device 101 may further include a relay station, an access point, and a base station in the future 5G network, a base station in the future evolved PLMN, an NR base station, or the like. The network device 102 may be a wearable device or a vehicle-mounted device. Alternatively, the network device 102 may be a chip having a communication module.

For example, the network device 102 includes but is not limited to a next generation NodeB (gNodeB, gNB) in 5G, an evolved NodeB (evolved NodeB, eNB) in an LTE system, a radio network controller (RNC), a radio controller in a CRAN system, a base station controller (BSC), a home base station (for example, home evolved NodeB, or home NodeB, HNB), a baseband unit (BBU), a transmission and receiving point (TRP), a transmitting point (TP), a mobile switching center, or the like. The network device 101 may further include a base station in a future 6G or newer mobile communication system.

The following uses the system shown in FIG. 1 as an example to describe a channel sounding manner in a conventional technology. The channel sounding manner may include uplink channel sounding performed based on an uplink pilot signal (which is also referred to as an uplink sounding reference signal) and downlink channel sounding performed based on a downlink pilot signal (which is also referred to as a downlink sounding reference signal).

Typical downlink channel sounding is performed based on a downlink channel state information reference signal (CSI-RS). For example, the terminal device 101 measures, based on a CSI resource configuration sent by the network device 102, CSI-RSs sent by the network device 102, to obtain a downlink channel characteristic, and the terminal device 101 reports the downlink channel characteristic to the network device 102 based on a CSI reporting configuration sent by the network device 102.

Uplink channel sounding is usually performed based on the uplink sounding reference signal (SRS). For example, the network device 102 sends an SRS configuration to the terminal device 101, the terminal device 101 sends SRSs based on the SRS configuration, and the network device 102 measures the SRSs sent by the terminal device 101, to obtain an uplink channel characteristic.

For example, based on the communication system shown in FIG. 1, TDD MIMO communication based on sparse SRSs may be implemented.

Figure 2:
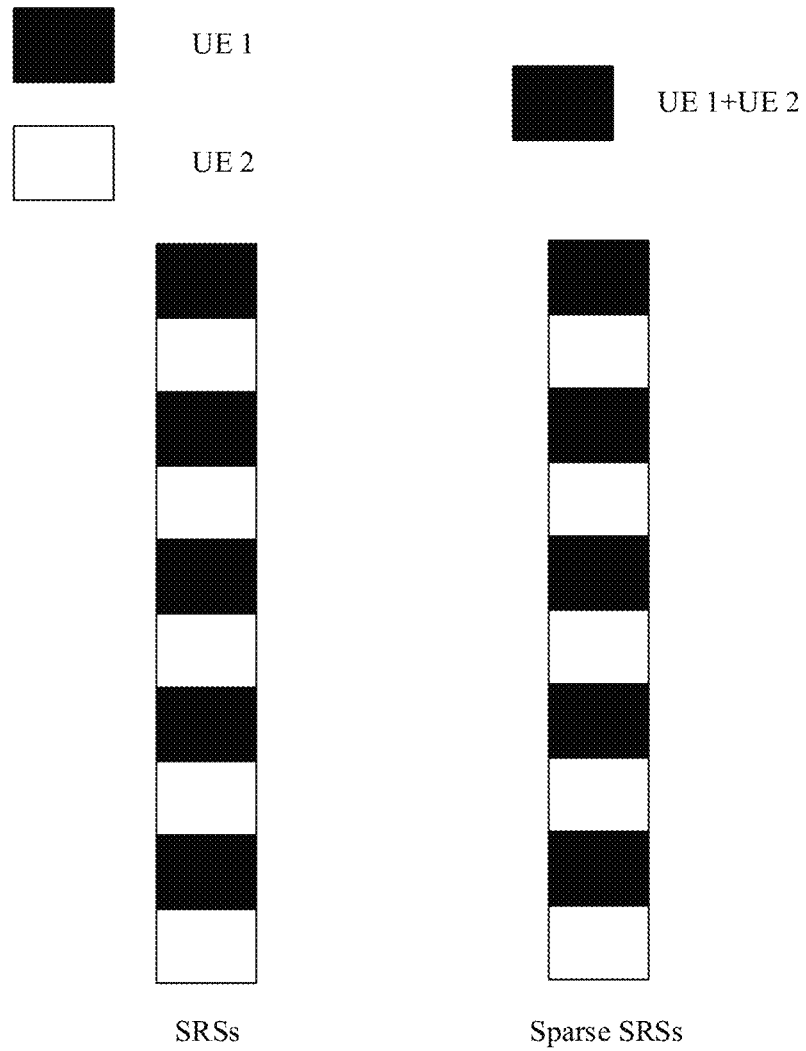
FIG. 2 is a schematic diagram of an SRS frequency domain resource according to an embodiment of this application.

An essential idea of a sparse SRS technology is to enable, by using an SRS pattern and a sequence design, channels of different users (namely, different terminal devices) to be orthogonal in delay domain. For example, as shown in FIG. 2, a channel of UE 1 and a channel of UE 2 are orthogonal in delay domain. Therefore, a same frequency domain resource is occupied in frequency domain, so that more terminal devices can be multiplexed on the premise of same SRS overheads. After receiving sparse SRSs, a network device first estimates superimposed equivalent delay domain channels of terminal devices, and then recovers channels of the terminal devices through delay shift. For a manner of recovering the channels of the terminal devices, refer to descriptions in a conventional technology.

An existing channel estimation solution based on sparse SRSs uses frequency domain channel sparseness in delay domain (where that is, a small quantity of delay taps include most of channel energy). Assuming that SRSs that are of a $j^{th}$ port of a terminal device and that are received by an $i^{th}$ port of a network device are $y_{ij}$, the SRSs may be represented as:

$$y_{ij}=h_{ij}+n_{ij}=A\tilde{h}_{ij}+n_{ij}. \qquad \text{(Formula 1)}$$

$h_{ij}$ represents a frequency domain channel that is between the $i^{th}$ receive port of the network device and the $j^{th}$ send port of the terminal device and that is on a subcarrier for sending SRSs, A represents a discrete Fourier transform (DFT) row extraction matrix, the DFT row extraction matrix is obtained by performing row extraction on a DFT matrix based on a position of the subcarrier for sending the SRSs, $\tilde{h}_{ij}$ represents a delay domain channel between the $i^{th}$ port of the network device and the $j^{th}$ send port of the terminal device, and $n_{ij}$ represents an additive noise vector between the $i^{th}$ receive port of the network device and the $j^{th}$ send port of the terminal device.

Figure 3:
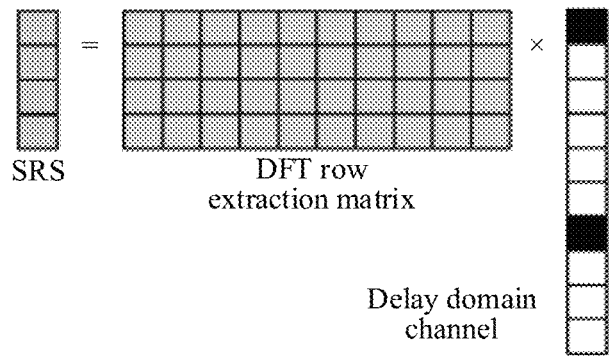
FIG. 3 is a schematic diagram of an SRS expression manner according to an embodiment of this application.

As shown in FIG. 3, it can be learned that an issue of estimating the delay domain channel $\tilde{h}_{ij}$ from the received SRSs $y_{ij}$ is equivalent to a sparse signal reconstruction issue, and may be solved by using a classic compressive sensing algorithm, for example, an orthogonal matched pursuit (OMP) algorithm.

However, as a quantity of multiplexed terminal devices increases, a quantity of delay paths (or paths for short) that need to be estimated in an equivalent delay domain channel increases exponentially. This causes a decrease in uplink channel estimation accuracy. One delay path corresponds to one element in a delay channel vector. In addition, because an uplink transmit power is low, interference is strong, and a signal to noise ratio of an SRS is usually quite low (<0 decibels (dB)), it is difficult to accurately estimate a delay path, and uplink channel estimation accuracy is seriously affected. Therefore, it can be learned that, to fully obtain a gain brought by a high multiplexing capability of sparse SRSs, a bottleneck problem, namely, low uplink channel estimation accuracy, needs to be resolved first.

To improve uplink channel estimation accuracy, an embodiment of this application provides a communication method. The communication method may be implemented by a first communication apparatus and a second communication apparatus. The first communication apparatus may include a terminal device or a component (for example, a processor, a circuit, a chip, or a chip system) in the terminal device. The terminal device herein is, for example, the terminal device 101 shown in FIG. 1. The second communication apparatus may include a network device or a component (for example, a processor, a circuit, a chip, or a chip system) in the network device. The network device herein is, for example, the network device 102 shown in FIG. 1.

Figure 4:
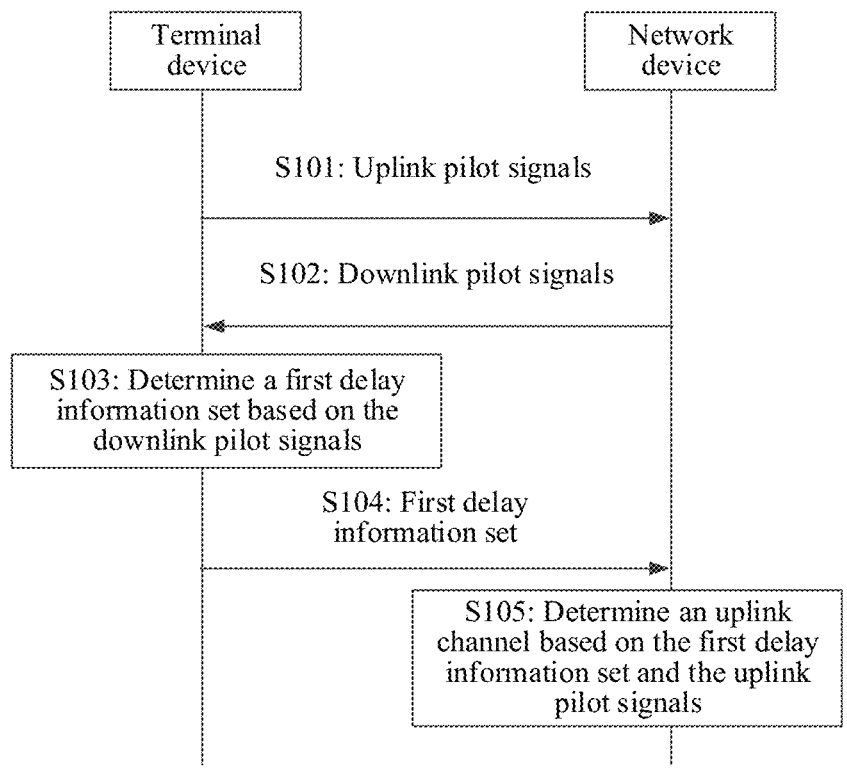
FIG. 4 is a schematic flowchart of a communication method according to an embodiment of this application.

As shown in FIG. 4, the method may include the following operations.

S101: The terminal device sends uplink pilot signals to the network device. For example, the terminal device sends SRSs.

In an embodiment, before S101, the network device may send an uplink pilot signal configuration (which is also referred to as uplink pilot signal configuration information) to the terminal device. For example, the uplink pilot signals are the SRSs. The uplink pilot signal configuration may include an SRS resource set, and the SRS resource set is used by the terminal device to send the SRSs.

In an embodiment, the uplink pilot signals herein are sparse SRSs.

Accordingly, the network device receives the uplink pilot signals from the terminal device.

S102: The network device sends downlink pilot signals to the terminal device. For example, the network device sends CSI-RSs to the terminal device.

Accordingly, the terminal device receives the downlink pilot signals from the network device.

In an embodiment, before S102, the network device may send a downlink channel state information feedback configuration (which is also referred to as downlink channel state information feedback configuration information) to the terminal device, so that the terminal device sends downlink channel state information to the network device based on the feedback configuration. The terminal device obtains the downlink channel state information based on the downlink pilot signals. For example, if the downlink pilot signals are the CSI-RSs, the downlink channel state information may include CSI.

For example, the downlink channel state information is the CSI. A CSI feedback configuration may be for configuring CSI feedback content. For example, if the terminal device is configured to feed back a channel quality indicator (CQI), a rank indicator (RI), and/or the like, the terminal device may send the CQI and/or the RI to the network device based on the CSI feedback content.

In an embodiment, the downlink channel state information feedback configuration may be for configuring the terminal device to report a first delay information set to the network device. For example, the downlink channel state information feedback configuration carries information indicating the terminal device to report the first delay information set to the network device.

S103: The terminal device determines the first delay information set based on the downlink pilot signals.

The first delay information set includes P pieces of first delay information. A $p^{th}$ piece of first delay information in the P pieces of first delay information is related to a downlink channel between the network device and the terminal device. The downlink channel related to the $p^{th}$ piece of first delay information is a downlink channel between a send port (which is also referred to as a transmit port) of the network device and a receive port of the terminal device, for example, a downlink channel between an $i^{th}$ send port of the network device and a $j^{th}$ receive port of the terminal device.

In an embodiment, P is a positive integer less than or equal to M×K, p=1, 2, ..., or P, M represents a quantity of send ports of the network device, K represents a quantity of receive ports of the terminal device, i=1, 2, ..., or M, and j=1, 2, ..., or K. In addition, a value of P may alternatively be set to another value, for example, set to a constant. The value of P may be determined in a preconfiguration manner, or may be indicated by the network device (for example, indicated by the downlink channel state information feedback configuration).

For example, the $p^{th}$ piece of first delay information may indicate at least one of the following:

a quantity $N_p$ of paths of the downlink channel corresponding to the $p^{th}$ piece of first delay information, where $N_p$ is a positive integer;

a delay position of each of $N_p$ paths of the downlink channel corresponding to the $p^{th}$ piece of first delay information; or a gain of a delay position of each of at least L paths in $N_p$ paths of the downlink channel corresponding to the $p^{th}$ piece of first delay information, where L is a positive integer less than or equal to $N_p$.

It should be understood that the $p^{th}$ piece of first delay information may indicate $N_p$ strongest-energy delay paths that are of the downlink channel corresponding to the $p^{th}$ piece of first delay information and that are determined based on the downlink pilot signals.

In addition, when the downlink channel related to the $p^{th}$ piece of first delay information is the downlink channel between the $i^{th}$ send port of the network device and the $j^{th}$ receive port of the terminal device, $N_p$ may be represented as $N_{ij}$.

S104: The terminal device sends the first delay information set to the network device.

Accordingly, the network device receives the first delay information set.

The terminal device may determine the first delay information set and send the first delay information set to the network device based on the downlink channel state information feedback configuration; the network device indicates, by using information other than the downlink channel state information feedback configuration, the terminal device to determine the first delay information set and send the first delay information set to the network device; or the terminal device may determine the first delay information set and send the first delay information set to the network device based on a preconfiguration.

In an embodiment, the terminal device may include the first delay information set in the downlink channel state information fed back to the network device. For example, when the downlink pilot signals are the CSI-RSs, the terminal device may include the first delay information set in a CSI report. The CSI report may be for feeding back downlink channel information, for example, for carrying the CSI feedback content. For example, if the downlink channel state information feedback configuration indicates the terminal device to send the first delay information set, the terminal device may include the first delay information set in the downlink CSI.

In addition, the terminal device may alternatively send the first delay information set to the network device in a manner other than a manner of using the downlink channel state information. For example, the terminal device sends the first delay information set to the network device by using separate signaling other than the downlink channel state information.

S105: The network device determines, based on the first delay information set and the uplink pilot signals, an uplink channel between K' send ports of the terminal device and M' receive ports of the network device.

According to the foregoing method, the terminal device may send the uplink pilot signals, the terminal device obtains the first delay information set based on the downlink pilot signals from the network device, and the network device jointly considers the first delay information set and the uplink pilot signals to perform uplink channel estimation. Because a downlink transmit power is higher than an uplink transmit power, the terminal device usually can obtain the downlink channel information more accurately. In this case, for a system that has uplink-downlink channel reciprocity, such as a TDD system, the network device may perform joint uplink channel estimation based on the first delay information set obtained through downlink channel estimation and the uplink pilot signals. Therefore, uplink channel estimation accuracy can be improved.

In an embodiment, if the uplink pilot signals include the sparse SRSs, a more accurate uplink channel estimation result may be obtained without increasing SRS overheads, and accuracy of channel estimation performed based on the sparse SRSs is improved.

During implementation of S103, the terminal device may receive second delay information from the network device, and determine the first delay information set based on the second delay information and the downlink pilot signals. The second delay information may indicate a quantity T of paths of the uplink channel between the K' send ports of the terminal device and the M' receive ports of the network device, where T is a positive integer; and/or the second delay information may indicate a delay position of each of the T paths of the uplink channel between the K' send ports of the terminal device and the M' receive ports of the network device.

In an embodiment, in the first delay information set, the delay positions of the $N_p$ paths in the $p^{th}$ piece of first delay information is a subset of a set including the delay position of each of the T paths in the second delay information, and $N_p \leq T$. In addition, the $p^{th}$ piece of first delay information indicates indexes of the delay positions of the $N_p$ paths in the delay positions of the T paths.

For example, the network device may determine the second delay information based on the uplink pilot signals in S101.

Figure 5:
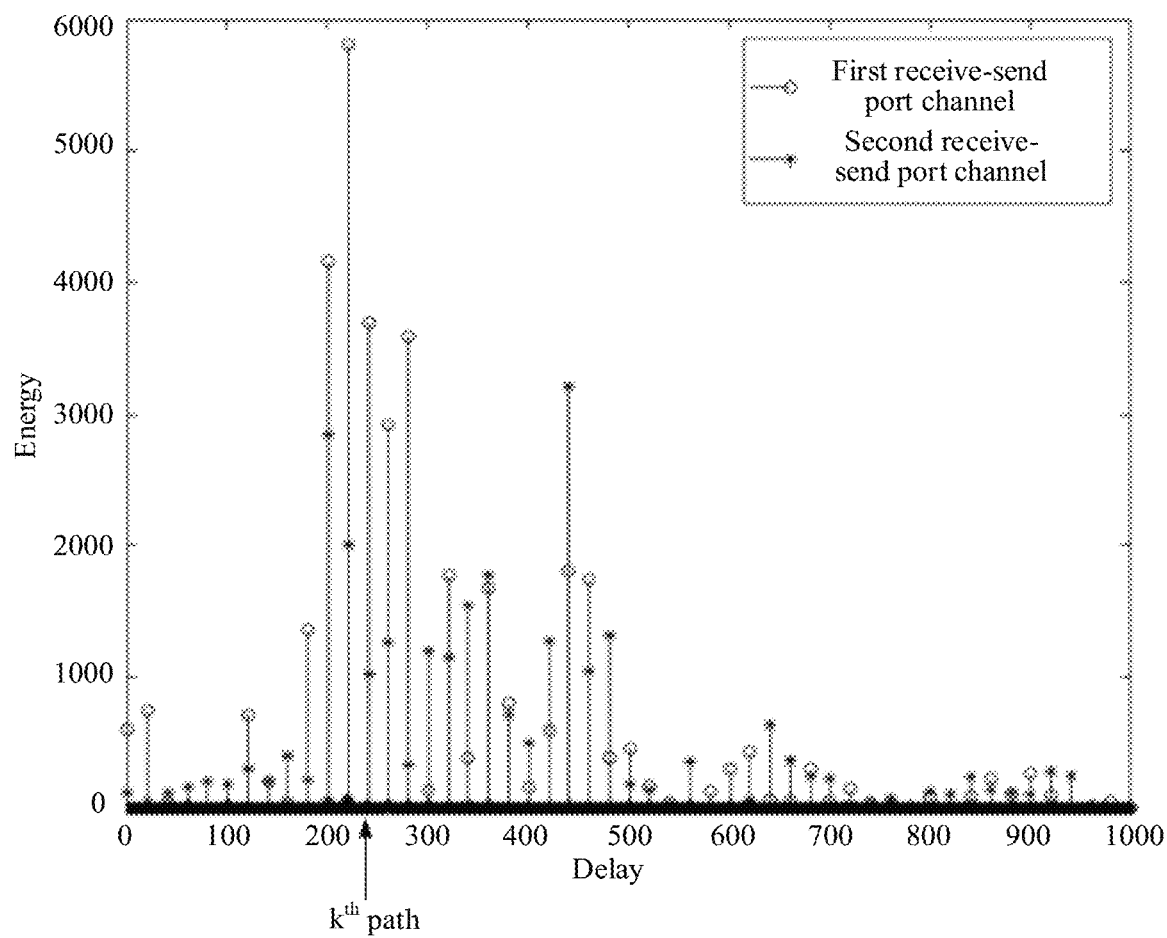
FIG. 5 is a schematic diagram of delay domain SRS channels according to an embodiment of this application.

With reference to FIG. 5, an example in which the uplink pilot signals are the SRSs is used below to describe a manner in which the network device determines the second delay information.

It is assumed that SRSs that are of a $j^{th}$ send port of the terminal device and that are received by an $i^{th}$ receive port of the network device are $y_{ij}$, where $y_{ij}$ satisfies Formula 1 above.

$h_{ij}$ represents a frequency domain channel that is between the $i^{th}$ receive port of the network device and the $j^{th}$ send port of the terminal device and that is on a subcarrier for sending SRSs, A represents a DFT row extraction matrix, the DFT row extraction matrix is obtained by performing row extraction on a DFT matrix based on a position of the subcarrier for sending the SRSs, $\tilde{h}_{ij}$ represents a delay domain channel between the $i^{th}$ receive port of the network device and the $j^{th}$ send port of the terminal device, and $n_{ij}$ represents an additive noise vector between the $i^{th}$ receive port of the network device and the $j^{th}$ send ports of the terminal device.

Based on the foregoing assumption, $\tilde{h}_{ij}$ represents a delay channel (which is also referred to as an uplink delay channel) between (i, j)$^{th}$ receive-send ports, namely, an uplink channel between the $i^{th}$ receive port of the network device and the $j^{th}$ send port of the terminal device. It can be learned from FIG. 5 that receive-send port channels have quite close delay path positions, but a path energy difference is large. If a delay path of each receive-send port channel is separately estimated, some paths with weaker energy are quite easily overwhelmed by noise, and cannot be accurately estimated, for example, a $k^{th}$ path of a second receive-send port channel in FIG. 5. However, because energy of a $k^{th}$ path of a first receive-send port channel is stronger, if the first receive-send port channel and the second receive-send port channel are joint, the $k^{th}$ path can still be accurately estimated.

Based on the foregoing idea, all delay channels may be joint to estimate a delay position set, to eliminate noise impact. For example, Formula (1) may be expressed as:

$$Y=A\tilde{H}+N,\ Y=[y_{11},y_{12},\ldots,y_{M'K'}],\ \tilde{H}=[\tilde{h}_{11},\tilde{h}_{12},\ldots,\tilde{h}_{M'K'}]. \quad \text{(Formula 2)}$$

M' indicates a total quantity of receive ports of the network device, K' indicates a total quantity of send ports of the terminal device, N indicates an additive noise matrix, $\tilde{h}_{11}, \tilde{h}_{12}, \ldots, \tilde{h}_{M'K'}$ are all sparse delay channels, delay path positions are all the same, that is, $T=S(\tilde{h}_{11})=S(\tilde{h}_{12})=\ldots S(\tilde{h}_{M'K'})$, and $S(\bullet)$ is a delay position extraction function. $\mathcal{T}$ is referred to as a set of delay positions shared by delay channels. In this case, an issue of estimating $\mathcal{T}$ from known Y is equivalent to a classic multiple measurement vector (multiple measurement vector) issue, and $\mathcal{T}$ may be solved by using an algorithm such as classic synchronous OMP (SOMP).

Then, the network device may send the second delay information to the terminal device, where the second delay information may indicate $\mathcal{T}$. For example, the second delay information may indicate a quantity T of elements included in $\mathcal{T}$, for example, indicate the quantity of paths of the uplink channel between the K' send ports of the terminal device and the M' receive ports of the network device; and/or the second delay information may indicate T elements included in $\mathcal{T}$, for example, the delay position of each of the T paths of the uplink channel between the K' send ports of the terminal device and the M' receive ports of the network device.

In another possible manner, Y shown in Formula 2 may be multiplied by $A^H$, and then several strongest-energy rows in a matrix $A^H Y$ obtained through multiplication are obtained, to obtain T, where $A^H$ represents a transposed matrix of A.

In addition, Formula 2 is a system model formula, and has many equivalent transformations. It should not be understood as that the formula is used as a unique manner of determining an expression of Y. For example, Y, $\tilde{H}$, N, or the like may be converted from a matrix into a vector.

In an embodiment, the second delay information may include all T elements in $\mathcal{T}$. In other words, the second delay information may include $\mathcal{T}$.

In an embodiment, if a length of a cyclic prefix (CP) of a system is $N_{CP}$, it may be assumed that all elements in the delay position set $\mathcal{T}$ are less than $N_{CP}$. When sending all the elements in $\mathcal{T}$, the network device may only need to perform quantization based on K=$\lceil \log_2 N_{CP} \rceil$ bits, where $\lceil \bullet \rceil$ is a round-up function.

In an embodiment, if the second delay information includes $\mathcal{T}$, when the network device sends the downlink pilot signals (for example, the CSI-RSs), the $i^{th}$ send port (1≤i≤M) only needs to send the downlink pilot signals on Q≥|$\mathcal{T}$| subcarriers, where |$\mathcal{T}$| represents a total quantity of the elements in $\mathcal{T}$. Therefore, compared with an existing manner in which downlink pilot signals need to be sent on each resource block, this manner can greatly reduce overheads for sending the downlink pilot signals. Q is a quantity of frequency domain positions in $\mathcal{P}$, namely, a quantity of elements in $\mathcal{P}$, where the quantity may be represented as |P|.

In an embodiment, it is assumed that the set $\mathcal{P}$ is a set of frequency domain positions (which is also referred to as subcarrier positions) at which the downlink pilot signals are sent. The frequency domain positions of the downlink pilot signals may be distributed at unequal intervals. The unequal-interval distribution means that subcarriers occupied by all pilot signals and included in the set $\mathcal{P}$ are not uniformly distributed. For example, if numbers of the subcarriers occupied by all the pilot signals and included in the set $\mathcal{P}$ are $l_0, l_1, \ldots,$ and $l_Q, l_0, l_1, \ldots,$ and $l_Q$ are not an arithmetic progression.

For example, $\mathcal{P}$ and an optimal set $\mathcal{P}*$ of $\mathcal{P}$ may be set to satisfy the following formula:

$$\mathcal{P}^* = \operatorname*{argmin}_{\mathcal{P}} \left\| I - \hat{A}^H - (\mathcal{P}, \mathcal{T})\hat{A}(\mathcal{P}, \mathcal{T}) \right\|_F^2. \quad \text{(Formula 3)}$$

$\hat{A}(\mathcal{P}, \mathcal{T})$ represents a submatrix formed by extracting a row and a column of the DFT matrix respectively based on the position sets $\mathcal{P}$ and $\mathcal{T}$, and $\|X\|_F^2$ represents a Frobenius norm of a matrix X, namely, a sum of squares of all elements in X. A physical meaning of Formula 3 is to make column correlation of $\hat{A}(\mathcal{P}, \mathcal{T})$ as small as possible. Therefore, frequency domain positions included in $\mathcal{P}$ determined according to Formula 3 are distributed at unequal intervals, to ensure downlink channel estimation accuracy of the terminal device.

In an embodiment, the network device may indicate $\mathcal{P}$ by using first information. In an embodiment, before S102, the network device may send the first information to the terminal device, where the first information may indicate time domain positions and/or frequency domain positions of the downlink pilot signals. The first information may be carried in a radio resource control (RRC) message, a media access control (MAC) control element (MAC CE), or downlink control information (DCI).

In addition, it can be learned from Formula 3 that $\mathcal{P}$ is related only to $\mathcal{T}$. Because the terminal device may obtain $\mathcal{T}$, the network device does not need to deliver $\mathcal{P}$ to a user. The terminal device may obtain $\mathcal{T}$ according to Formula 3. That is, the terminal device may determine the frequency domain positions of the downlink pilot signals based on the second delay information.

In an embodiment, to reduce calculation complexity and avoid that downlink pilot signals of terminal devices have different frequency domain positions (where if the frequency domain positions are different, another user cannot send data at these frequency domain positions), the frequency domain positions at which the downlink pilot signals are sent may be uniformly arranged in an entire band, to ensure that users send the downlink pilot signals at a same frequency domain position (for example, a subcarrier).

The following describes a manner of determining the first delay information set by using a scenario in which the terminal device receives the second delay information and the second delay information includes $\mathcal{T}$ as an example.

Assuming that downlink pilot signals (for example, CSI-RSs) that are sent by the $i^{th}$ send port of the network device and that are received by the $j^{th}$ receive port of the user are $\bar{y}_{ij}$, $\bar{y}_{ij}$ may be expressed as:

$$\bar{y}_{ij} = \bar{h}_{ij} + n_{ij} = \bar{A}\tilde{h}_{ij} + n_{ij}. \quad \text{(Formula 4)}$$

$\bar{h}_{ij}$ represents a frequency domain channel that is between the $i^{th}$ send port of the network device and the $j^{th}$ receive port of the user and that is on a subcarrier for sending the downlink pilot signals, $\bar{A}$ represents a DFT row extraction matrix, the DFT row extraction matrix is obtained by performing row extraction on the DFT matrix based on a position of the subcarrier for sending the downlink pilot signals, and $\tilde{h}_{ij}$ represents a delay domain channel between the $i^{th}$ send port of the network device and the $j^{th}$ receive port of the terminal device.

When $\tilde{h}_{ij}$ is sparse vectors, and the terminal device may obtain $\mathcal{T}$, Formula 4 may be approximately:

$$\bar{y}_{ij} \approx \bar{A}(:, \mathcal{T})\tilde{h}_{ij}(\mathcal{T}) + n_{ij}. \quad \text{(Formula 5)}$$

$\bar{A}(:, \mathcal{T})$ means extracting a column of $\bar{A}$ based on $\mathcal{T}$, and $\tilde{h}_{ij}(\mathcal{T})$ indicates extracting an element in $\tilde{h}_{ij}$ based on $\mathcal{T}$. When each send port of the network device sends CSI-RSs on Q≥subcarriers, it is known that estimating $\tilde{h}_{ij}(\mathcal{T})$ from $\bar{y}_{ij}$ is equivalent to a classic least square issue, and a solution thereof satisfies:

$$\hat{h}_{ij}(\mathcal{T}) = (\bar{A}^H(:, \mathcal{T})\bar{A}(:, \mathcal{T}))^{-1}\bar{A}^H(:, \mathcal{T})\bar{y}_{ij} = \tilde{h}_{ij}(\mathcal{T}) + ($$
$$\bar{A}^H(:, \mathcal{T})\bar{A}(:, \mathcal{T}))^{-1}\bar{A}^H(:, \mathcal{T})n_{ij}. \quad \text{(Formula 6)}$$

Equivalent noise is and energy is $(\bar{A}^H(:, \mathcal{T})\bar{A}(:, \mathcal{T}))^{-1}$ $\bar{A}^H(:, \mathcal{T})n_{ij}$, and energy is $\|(\bar{A}^H(:, \mathcal{T})\bar{A}(:, \mathcal{T}))^{-1}\|_F^2 \sigma^2$.

If a subcarrier set of the downlink pilot signals satisfies Formula 3, $\bar{A}(:, \mathcal{T})$ satisfies:

$$\bar{A}(:, T) = \hat{A}(P^*, T). \quad \text{(Formula 7)}$$

Because $\hat{A}^H(P^*, T)\hat{A}(P^*, T)$ is close to a unit matrix, energy of the equivalent noise is the weakest, and downlink channel estimation accuracy is the highest. In other words, when the subcarrier set of the downlink pilot signals satisfies Formula 3, the energy of the equivalent noise is the weakest, and the downlink channel estimation accuracy is the highest.

After obtaining $\tilde{h}_{ij}(\mathcal{T})$, the terminal device may sort elements in $\tilde{h}_{ij}(\mathcal{T})$ in descending order based on amplitudes, and select the first $N_{ij}$ element positions as strong-path positions of an $(i, j)^{th}$ delay channel, to obtain the first delay information set. The set may be represented as $\{\mathcal{N}_{ij}, \forall i, \forall j\}$.

For example, a value of $N_{ij}$ may be indicated by the network device in the downlink channel state information feedback configuration. For example, the terminal device may obtain the value of $N_{ij}$ through calculation based on the configuration information carried by the network device in the downlink channel state information feedback configuration.

In S104, when sending the first delay information set to the network device, the terminal device may report a strong-path position of each delay channel to the network device.

In addition, when the terminal device receives the second delay information from the network device, and the second delay information includes $\mathcal{T}$, the terminal device may send a relative position, in $\mathcal{T}$, of each element in the first delay information set to the network device, to implement indication of the first delay information set. For example, if the terminal device finds that a strong-path position of a delay channel is 8 (where that is, an element in the first delay information set is 8), and 8 is the second element in $\mathcal{T}$, the terminal device only needs to send 2 to the network device.

One advantage of such behaviour is that feedback overheads can be reduced. For example, the feedback overheads are reduced from $N_{ij}\lceil \log_2 N_{CP}\rceil$ to $N_{ij}\lceil \log_2 |\mathcal{T}|\rceil$, where $|\mathcal{T}|\ll N_{CP}$. Another advantage is that an uplink-downlink timing offset can be eliminated. For example, due to a timing problem, the strong-path position 8 estimated by the terminal device should be a position 7 on a network device side. In this case, if the terminal device feeds back the position 8, performance loss is caused. However, if the user feeds back the second number in $\mathcal{T}$, the network device can still obtain correct delay position information.

During implementation of S105, the network device may estimate a strong-path gain and a weak-path gain of the $(i, j)^{th}$ uplink channel based on the uplink pilot signals and the first delay information set that is reported by the terminal device. The strong-path gain is, for example, a gain of a delay path whose energy reaches a specified value, and/or may be a gain of the first $N_p$ strongest-energy delay paths. The weak-path gain is, for example, a gain of a delay path whose energy does not reach a specified value, and/or may be a gain of a delay path other than the first $N_p$ strongest-energy delay paths.

For example, the network device may estimate, based on a strong-path position that is of the downlink channel corresponding to the $p^{th}$ piece of first delay information and that is indicated by the first delay information, a gain of a strong path of an uplink channel corresponding to the $p^{th}$ piece of first delay information. As described above, the first delay information set includes the P pieces of first delay information. The $p^{th}$ piece of first delay information in the P pieces of first delay information is related to the downlink channel between the network device and the terminal device. The downlink channel related to the $p^{th}$ piece of first delay information is the downlink channel between the send port of the network device and the receive port of the terminal device, for example, the downlink channel between the $i^{th}$ send port of the network device and the $j^{th}$ receive port of the terminal device. In other words, the $p^{th}$ piece of first delay information may indicate at least one of a strong-path quantity, a delay domain position, or a gain of the downlink channel corresponding to the $p^{th}$ piece of first delay information. In addition, because of uplink-downlink channel reciprocity, the network device may estimate gains at strong-path positions on the uplink channel based on the strong-path quantity and/or the delay domain position of the downlink channel corresponding to the $p^{th}$ piece of first delay information and the uplink pilot signals.

For example, a strong-path gain may be determined according to Formula 6. For example, a strong-path gain $\hat{h}_{ij}(N_{ij})$ of an uplink channel between the $i^{th}$ send port of the network device and the $j^{th}$ receive port of the terminal device satisfies:

$$\hat{h}_{ij}(N_{ij})=(A^H(:,N_{ij})A(:,N_{ij}))^{-1}A^H(:,N_{ij})y_{ij}=\tilde{h}_{ij}(N_{ij})+(A^H(:,N_{ij})A(:,N_{ij}))^{-1}A^H(:,N_{ij})n_{ij}. \quad \text{(Formula 8)}$$

In addition, a path position other than the strong-path position indicated by the $p^{th}$ piece of first delay information is a weak-path position, and the network device may determine a weak-path gain based on an uplink pilot resource and $\hat{h}_{ij}(N_{ij})$.

For example, the uplink pilot signal is the SRS. When a signal to noise ratio of the SRS is low (for example, <0 dB), a weak path of each downlink channel is quite easily overwhelmed by noise. In this case, only a strong-path gain is considered during uplink channel estimation. A weak-path gain is set to zero, so that noise can be effectively reduced, and channel estimation accuracy can be improved. However, when a signal to noise ratio of the SRS is high (>0 dB), a weak path could have been correctly estimated. In this case, if the weak path is still set to zero, channel estimation accuracy decreases. Therefore, the network device should determine when to estimate only the strong path and when to estimate both the strong path and the weak path.

To achieve the foregoing objective, in a feasible manner, the network device re-estimates a strong-path position $\overline{\mathcal{N}}_{ij}$ on each uplink channel based only on an SRS received signal, and makes a comparison with $\mathcal{N}_{ij}$ reported by the user. If most elements in $\mathcal{N}_{ij}$ are the same as those in $\overline{\mathcal{N}}_{ij}$ (where for example, a threshold 90% may be set), it is considered that the signal to noise ratio of the SRS is higher. Alternatively, the network device may directly estimate an uplink signal to noise ratio, to determine whether the SRS is in a high signal to noise ratio range.

If it is determined that both the strong path and the weak path should be estimated, the network device cancels interference of the strong path after estimating the strong path. That is, $A(:,\mathcal{N}_{ij})\hat{h}_{ij}(\mathcal{N}_{ij})$ is subtracted from Formula (1) to obtain:

$$r_{ij}=y_{ij}-A(:,\mathcal{N}_{ij})\hat{h}_{ij}(\mathcal{N}_{ij})=A(\tilde{h}_{ij}-\hat{h}_{ij}(\mathcal{N}_{ij}))+n_{ij}. \quad \text{(Formula 8)}$$

Then, the network device continues to estimate the weak path. $\tilde{h}_{ij}-\hat{h}_{ij}(\mathcal{N}_{ij})$ includes only the weak path, and is still sparse vectors. Therefore, weak-path estimation may still be solved according to a compressive sensing algorithm, for example, OMP.

In addition, during implementation of S105, when the first delay information indicates the strong-path gain, the network device may obtain the strong-path gain based on the first delay information without re-determining the strong-path gain.

The network device may alternatively receive a strong-path gain from the terminal device. When a signal to noise ratio of an uplink SRS is low, a strong-path gain estimated by the network device may be inaccurate. Therefore, reporting the strong-path gain by the terminal device may further improve channel estimation accuracy. In addition, in a non-antenna-selection scenario, when the terminal device cannot send SRSs on some ports, the terminal device may feed back the strong-path gain, so that the network device can still obtain some accurate delays on uplink channels.

However, it should be noted that, feeding back both the strong-path gain and the weak-path gain causes higher feedback overheads, and a gain can be greater than overheads only in some scenarios (for example, the foregoing two scenarios).

For example, the terminal device may include, in the first delay information set, the gain of the delay position of each of the at least L paths in the $N_p$ paths, or a value obtained through quantization performed on the gain of the delay position of each of the at least L paths based on n bits. For example, a phase of the gain may be quantized uniformly based on x bits within 0 to $2\pi$, and an amplitude of the gain may be quantized uniformly based on y bits within a preset quantization range.

Whether a strong-path gain is carried in the first delay information set, a quantity of carried strong-path gains, and/or a quantity of bits based on which quantization is performed may be indicated by the network device to the terminal device by using the downlink channel state information feedback configuration.

In an embodiment, the network device may indicate, by using second information, the terminal device to feed back the first delay information set to the network device. For example, the second information may be carried in an RRC message, a MAC CE, or DCI. For example, the second information is carried in the downlink channel state information feedback configuration. In other words, the second information includes the downlink channel state information feedback configuration.

In an embodiment, the network device may indicate, by using third information, the terminal device to receive the second delay information. For example, the third information may be carried in an RRC message, a MAC CE, or DCI. The third information may be the same as the second information, or the second information and the third information may be carried in a same message, same signaling, or same information.

It should be understood that, when the terminal device does not receive the second delay information from the network device, the terminal device may estimate a strong-path position on each downlink channel based on a downlink pilot signal received signal, to obtain the first delay information set. For example, if the terminal device does not receive the second delay information, the terminal device may directly perform OMP solving on Formula 4, to obtain positions of $N_p$ strongest-energy elements, and determine the first delay information set.

An embodiment of this application further provides another communication method. The communication method may be implemented by a first communication apparatus and a second communication apparatus. The first communication apparatus may include a terminal device or a component (for example, a processor, a circuit, a chip, or a chip system) in the terminal device. The terminal device herein is, for example, the terminal device 101 shown in FIG. 1. The second communication apparatus may include a network device or a component (for example, a processor, a circuit, a chip, or a chip system) in the network device. The network device herein is the network device 102 shown in FIG. 1.

Figure 6:
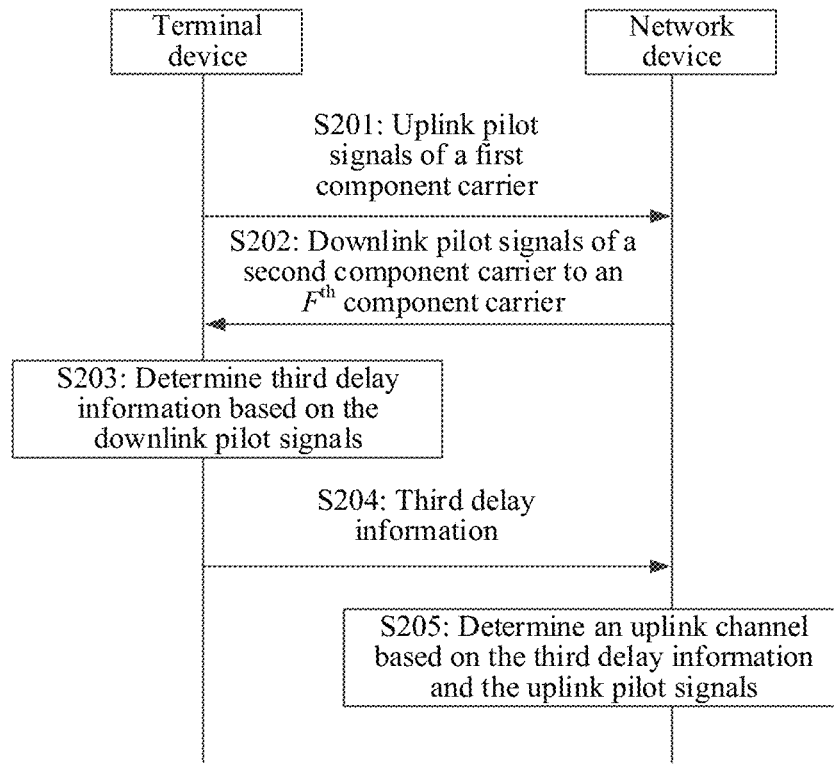
FIG. 6 is a schematic flowchart of another communication method according to an embodiment of this application.

As shown in FIG. 6, the method may include the following operations.

S201: The terminal device sends uplink pilot signals of a first component carrier to the network device.

In other words, the terminal device sends the uplink pilot signals to the network device by using the first component carrier.

In an embodiment, before S201, the network device may send an uplink pilot signal configuration to the terminal device. For a manner of setting the uplink pilot signal configuration, refer to the descriptions in the procedure shown in FIG. 4. Details are not described herein again.

In an embodiment, the uplink pilot signals herein are sparse SRSs.

Accordingly, the network device receives the uplink pilot signals from the terminal device.

S202: The network device sends downlink pilot signals of a second component carrier to an $F^{th}$ component carrier to the terminal device, where F is a positive integer greater than or equal to 2, and the first component carrier is one of the second component carrier to the $F^{th}$ component carrier.

In other words, the network device sends the uplink pilot signals to the network device by using the second component carrier to the $F^{th}$ component carrier.

Accordingly, the terminal device receives, from the network device, the downlink pilot signals of the second component carrier to the $F^{th}$ component carrier.

In an embodiment, before S203, the network device may send a downlink channel state information feedback configuration to the terminal device, so that the terminal device sends downlink channel state information to the network device based on the feedback configuration. For setting of the downlink channel state information feedback configuration, refer to the descriptions in the procedure shown in FIG. 4. Details are not described herein again.

S203: The terminal device determines third delay information based on the downlink pilot signals.

The third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel.

In an embodiment, the downlink channel state information feedback configuration may be for configuring the terminal device to report the third delay information to the network device. For example, the downlink channel state information feedback configuration carries information indicating the terminal device to report the third delay information to the network device.

In an embodiment, the downlink channel state information feedback configuration may indicate $R_1$.

S204: The terminal device sends the third delay information to the network device.

Accordingly, the network device receives the third delay information.

In an embodiment, the terminal device may include the third delay information in the downlink channel state information fed back to the network device. For a manner, refer to the descriptions of carrying a first delay information set in the downlink channel state information in this application.

In addition, the terminal device may alternatively send the third delay information to the network device in a manner other than a manner of using the downlink channel state information. For example, the terminal device sends the third delay information to the network device by using separate signaling other than the downlink channel state information.

S205: The network device determines, based on the third delay information and the uplink pilot signals, an uplink channel that is between K' send ports of the terminal device and M' receive ports of the network device and that is on the second component carrier to the $F^{th}$ component carrier.

According to the foregoing method, the network device may more accurately estimate an uplink channel on the second component carrier to the $F^{th}$ component carrier based on an SRS on the first component carrier, where the first component carrier is one of the second component carrier to the $F^{th}$ component carrier, to improve transmission performance.

Figure 7:
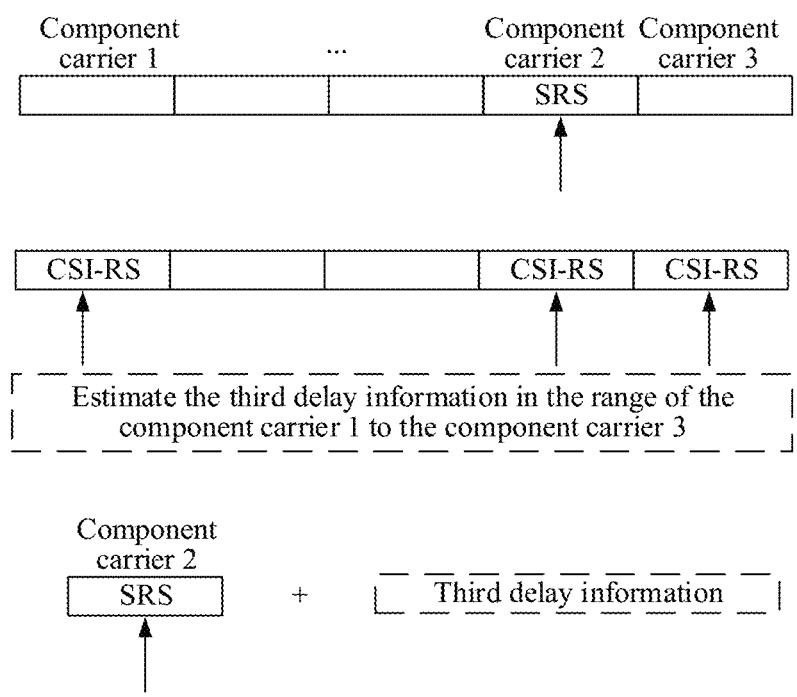
FIG. 7 is a schematic logical diagram of another communication method according to an embodiment of this application.

Operations of the method shown in FIG. 6 may also be shown in FIG. 7. It can be learned from FIG. 7 that, when the terminal device sends SRSs by using a component carrier 2, and the network device sends CSI-RSs by using a component carrier 1 to a component carrier 3, the terminal device may estimate a strong-path position corresponding to a delay channel in a range of the component carrier 1 to the component carrier 3, and report an estimation result to the network device, and the network device estimates an uplink channel of the terminal device based on the result reported by the terminal device and the uplink pilot signals.

For example, when CSI-RSs are sent on a first component carrier $f_1$ and a second component carrier $f_2$, and SRSs are sent on the first component carrier $f_1$, SRSs that are of the $j^{th}$ send port of the terminal device and that are received by the $i^{th}$ receive port of the network device satisfy:

$$y_{ij}(\mathcal{F}_{1\ 1})=h_{ij}(\mathcal{F}_{1\ 1})+n_{ij}(\mathcal{F}_{1\ 1})=A(\mathcal{F}_{1\ 1})\tilde{h}_{ij}+n_{ij}(\mathcal{F}_{1\ 1}). \quad \text{(Formula 9)}$$

$h_{ij}(\mathcal{F}_{1\ 1})$ represents a frequency domain channel on the first component carrier, between the $i^{th}$ receive port of the network device and the $j^{th}$ send port of the terminal device, and on a subcarrier position set $\mathcal{F}_{1\ 1}$ for sending SRSs, $A(\mathcal{F}_{1\ 1})$ represents a DFT row extraction matrix, $A(\mathcal{F}_{1\ 1})$ is obtained by performing row extraction on a DFT matrix based on the subcarrier position set $\mathcal{F}_{1\ 1}$ for sending the SRSs, $\tilde{h}_{ij}$ represents a broadband delay domain channel between the $i^{th}$ receive port of the network device and the $j^{th}$ send port of the terminal device (where that is, delay channels corresponding to broadband channels on the second component carrier and the $F^{th}$ component carrier are jointly considered), and $n_{ij}(\mathcal{F}_{1\ 1})$ represents an additive noise vector between the $i^{th}$ receive port of the network device and the $j^{th}$ send port of the terminal device.

In addition, it is assumed that CSI-RSs that are sent by the $i^{th}$ port of the network device and that are received by the $j^{th}$ port of the user are $z_{ij}(\mathcal{P}_1)$ and $z_{ij}(\mathcal{P}_2)$, the following formula may be obtained:

$$Z_{ij}(P) = \begin{bmatrix} Z_{ij}(P_1) \\ Z_{ij}(P_2) \end{bmatrix} = \quad \text{(Formula 10)}$$

$$A(P)\tilde{h}_{ij} + n_{ij}(P) = \begin{bmatrix} A(P_1) \\ A(P_2) \end{bmatrix}\tilde{h}_{ij} + \begin{bmatrix} n_{ij}(P_1) \\ n_{ij}(P_2) \end{bmatrix}.$$

$\mathcal{P}_1$ and $\mathcal{P}_2$ respectively represent subcarrier position sets for sending the CSI-RSs on the first component carrier $f_1$ and the second component carrier $f_2$, and $\mathcal{P}=\mathcal{P}_1\cup\mathcal{P}_2$.

When broadband delay channels $\tilde{h}_{ij}$ are sparse vectors, and it is assumed that non-zero positions of the broadband delay channels are $\mathcal{S}$, solving $\mathcal{S}$ from $z_{ij}(\mathcal{P})$ based on Formula 10 may be considered as a classic compressive sensing issue, and the terminal device may solve $\mathcal{S}$ by using an OMP algorithm. Then, the terminal device indicates estimated $\mathcal{S}$ to the network device by using the third delay information. The network device receives the third delay information, and may learn of $\mathcal{S}$. An element in $\mathcal{S}$ is the delay position of each of the $R_1$ paths of the downlink channel that is between the M send ports of the network device and the K receive ports of the terminal device and that is on the second component carrier to the $F^{th}$ component carrier.

In addition, according to Formula 9, frequency domain channels on component carriers all correspond to a same broadband delay channel $\tilde{h}_{ij}$. When the CSI-RSs are sent on the first component carrier $f_1$ and the second component carrier $f_2$, $h_{ij}(\mathcal{F}_{1\ 1})$ satisfies:

$$h_{ij}(\mathcal{F}_{1\ 1})=A(\mathcal{F}_{1\ 1})\tilde{h}_{ij}\approx A(\mathcal{F}_{1\ 1},\mathcal{S})\tilde{h}_{ij}(\mathcal{S}),\ h_{ij}(\mathcal{F}_{1\ 2})=A(\mathcal{F}_{1\ 2})\tilde{h}_{ij}\approx A(\mathcal{F}_{1\ 2},\mathcal{S})\tilde{h}_{ij}(\mathcal{S}). \quad \text{(Formula 11)}$$

The approximate expression is because $\tilde{h}_{ij}$ is sparse vectors, and an element that does not belong to $\mathcal{S}$ may be ignored.

Based on Formula 11, a relationship between frequency domain channels $h_{ij}(\mathcal{F}_{1\ 1})$ and $h_{ij}(\mathcal{F}_{1\ 2})$ on two carrier frequency units may be represented as:

$$h_{ij}(\mathcal{F}_2) \approx A(\mathcal{F}_2,\mathcal{S})\tilde{h}_{ij}(\mathcal{S}) = \quad \text{(Formula 12)}$$
$$A(\mathcal{F}_1,\mathcal{S})D_\mathcal{S}\tilde{h}_{ij}(\mathcal{S}) = A(\mathcal{F}_1,\mathcal{S})D_\mathcal{S}\big(A^H(\mathcal{F}_1,\mathcal{S})A(\mathcal{F}_1,\mathcal{S})\big)^{-1}$$
$$A^H(\mathcal{F}_1,\mathcal{S})A(\mathcal{F}_1,\mathcal{S})\tilde{h}_{ij}(\mathcal{S}) = \Phi A(\mathcal{F}_1,\mathcal{S})\tilde{h}_{ij}(\mathcal{S}) \approx \Phi h_{ij}(\mathcal{F}_1).$$

$D_\mathcal{S}$ is a diagonal rotation matrix, and is uniquely determined by $\mathcal{F}_{1\ 1}$, $\mathcal{F}_{1\ 2}$, and $\mathcal{S}$. For example, if a 4×4 DFT matrix is considered, there is the following relationship between the last two rows $\mathcal{F}_{1\ 2}=\{3,4\}$ and the first two rows $\mathcal{F}_{1\ 1}=\{1,2\}$:

$$\begin{bmatrix} e^{-j\frac{2\pi\times 2\times 0}{4}} & e^{-j\frac{2\pi\times 2\times 1}{4}} & e^{-j\frac{2\pi\times 2\times 2}{4}} & e^{-j\frac{2\pi\times 2\times 3}{4}} \\ e^{-j\frac{2\pi\times 3\times 0}{4}} & e^{-j\frac{2\pi\times 3\times 1}{4}} & e^{-j\frac{2\pi\times 3\times 2}{4}} & e^{-j\frac{2\pi\times 3\times 3}{4}} \end{bmatrix} = \quad \text{(Formula 13)}$$

$$\begin{bmatrix} e^{-j\frac{2\pi\times 0\times 0}{4}} & e^{-j\frac{2\pi\times 0\times 1}{4}} & e^{-j\frac{2\pi\times 0\times 2}{4}} & e^{-j\frac{2\pi\times 0\times 3}{4}} \\ e^{-j\frac{2\pi\times 1\times 0}{4}} & e^{-j\frac{2\pi\times 1\times 1}{4}} & e^{-j\frac{2\pi\times 1\times 2}{4}} & e^{-j\frac{2\pi\times 1\times 3}{4}} \end{bmatrix} \times$$

$$\begin{bmatrix} e^{-j\frac{2\pi\times 0}{4}} & & & \\ & e^{-j\frac{2\pi\times 2}{4}} & & \\ & & e^{-j\frac{2\pi\times 4}{4}} & \\ & & & e^{-j\frac{2\pi\times 6}{4}} \end{bmatrix}.$$

If further, when $\mathcal{S}=\{1,3\}$, $D_\mathcal{S}$ may satisfy:

$$D_\mathcal{S} = \begin{bmatrix} e^{-j\frac{2\pi\times 0}{4}} & \\ & e^{-j\frac{2\pi\times 4}{4}} \end{bmatrix}. \quad \text{(Formula 14)}$$

That is, based on Formula 13, a row and a column that belong to S and that are in a diagonal matrix are extracted to form a submatrix, and $D_\mathcal{S}$ is obtained.

It can be learned from Formula 12 that $\Phi=A(\mathcal{F}_{1\ 1},\mathcal{S})D_\mathcal{S}(A^H(\mathcal{F}_{1\ 1},\mathcal{S})A(\mathcal{F}_{1\ 1},\mathcal{S}))^{-1}A^H(\mathcal{F}_{1\ 1},\mathcal{S})$ depends only on $\mathcal{F}_{1\ 1}$, $\mathcal{F}_{1\ 2}$, and $\mathcal{S}$, where $\mathcal{F}_{1\ 1}$ and $\mathcal{F}_{1\ 2}$ are known to the network device, and $\mathcal{S}$ is reported by the terminal device to the network device. Once the network device estimates $h_{ij}(\mathcal{F}_{1\ 1})$ based on SRSs received on the first component carrier, $h_{ij}(\mathcal{F}_{1\ 2})$ may be deduced according to $h_{ij}(\mathcal{F}_{1\ 2})\approx \Phi h_{ij}(\mathcal{F}_{1\ 1})$.

In an embodiment, in S203, the terminal device may determine the third delay information based on the uplink pilot signals and the downlink pilot signals. For example, the terminal device may determine $R_2$ delay positions of the downlink channel based on the downlink pilot signals of the second component carrier to the $F^{th}$ component carrier, where $R_2$ is a positive integer greater than or equal to $R_1$; select $R_1$ delay positions from the $R_2$ delay positions of the downlink channel based on a position of a frequency domain resource for sending the uplink pilot signals of the first component carrier; and determine the third delay information based on the $R_1$ delay positions.

For example, it may be learned according to Formula 12 that $(A^H(\mathcal{F}_1, \mathcal{S})A(\mathcal{F}_1, \mathcal{S}))^{-1}$ needs to be calculated during calculation of $\Phi$. If $A^H(\mathcal{F}_1, \mathcal{S})A(\mathcal{F}_1, \mathcal{S})$ is irreversible, an extremely great error is caused by deducing $h_{ij}(\mathcal{F}_2)$ based on $h_{ij}(\mathcal{F}_1)$. Therefore, after a position $\mathcal{F}_1$ of a subcarrier for sending the SRSs on the first component carrier is determined, $\mathcal{S}$ should be selected to ensure reversibility of $A^H(\mathcal{F}_1, \mathcal{S})A(\mathcal{F}_1, \mathcal{S})$. To achieve this objective, in a possible practice, in Formula 10, a non-zero position set $\mathcal{S}_1$ is first obtained by using an algorithm such as OMP, and a quantity of elements in $\mathcal{S}_1$ is $R_2$. In other words, the terminal device may first determine the $R_2$ delay positions of the downlink channel based on the downlink pilot signals of the second component carrier to the $F^{th}$ component carrier. Then, the terminal device verifies whether $\mathcal{S}_1$ satisfies reversibility of $A^H(F_1,S_1) A(F_1,S_1)$. If $A^H(F_1,S_1) A(F_1,S_1)$ is reversible, $S=S_1$. Otherwise, an element corresponding to a smallest amplitude is deleted from $\mathcal{S}_1$, and whether a set obtained through deletion satisfies the foregoing condition is re-verified, and the verification does not end until the set satisfies the foregoing condition. A quantity of elements included in the determined S is $R_1$. $R_1 \leq R_2$.

In the foregoing process, an example in which the terminal device receives the downlink pilot signals sent by the network device by using the first component carrier and the second component carrier is used to describe the uplink channel estimation method in the procedure shown in FIG. 6. It should be understood that, when the network device sends downlink pilot signals by using more component carriers, the uplink channel may be estimated according to a similar method. For example, Formula 10 to Formula 14 above are appropriately extended to estimate the uplink channel. An specific extension manner can be implemented by one of ordinary skilled in the art based on the manner disclosed in the foregoing embodiment. Details are not described herein again.

In an embodiment, the network device may indicate, by using fourth information, the terminal device to feed back the third delay information to the network device. For example, the third information may be carried in an RRC message, a MAC CE, or DCI. For example, the fourth information is carried in the downlink channel state information feedback configuration. In other words, the fourth information includes the downlink channel state information feedback configuration.

The following describes, with reference to accompanying drawings, communication apparatuses configured to implement the foregoing methods in embodiments of this application. Therefore, all of the foregoing content may be used in subsequent embodiments. Repeated content is not described again.

Figure 8:
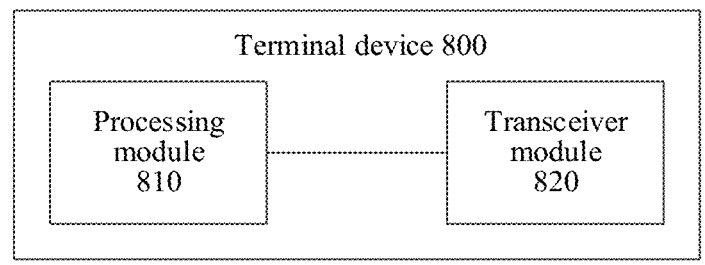
FIG. 8 is a schematic diagram of a structure of a communication apparatus according to an embodiment of this application.

FIG. 8 is a schematic block diagram of a communication apparatus according to an embodiment of this application. For example, the communication apparatus is, for example, a terminal device 800 shown in FIG. 8.

The terminal device 800 includes a processing module 810 and a transceiver module 820. For example, the terminal device 800 may be a network device, or may be a chip used in the terminal device or another combined device or a component that has a function of the terminal device. When the terminal device 800 is the terminal device, the transceiver module 820 may be a transceiver, and the transceiver may include an antenna, a radio frequency circuit, and the like; and the processing module 810 may be a processor, for example, a baseband processor, and the baseband processor may include one or more central processing units (CPUs). When the terminal device 800 is the component that has the function of the terminal device, the transceiver module 820 may be a radio frequency unit, and the processing module 810 may be a processor, for example, a baseband processor. When the terminal device 800 is a chip system, the transceiver module 820 may be an input/output interface of a chip (for example, a baseband chip), and the processing module 810 may be a processor of the chip system, and may include one or more central processing units. It should be understood that the processing module 810 in an embodiment of the application may be implemented by a processor or a processor-related circuit component, and the transceiver module 820 may be implemented by a transceiver or a transceiver-related circuit component.

For example, the processing module 810 may be configured to perform all operations, for example, S103, performed by the terminal device in the embodiment shown in FIG. 4 or FIG. 6 except receiving and sending operations, and/or configured to support another process of the technology in this specification, for example, generate a message, information, and/or signaling sent by the transceiver module 820, and process a message, information, and/or signaling received by the transceiver module 820. The transceiver module 820 may be configured to perform all receiving and sending operations performed by the terminal device in the embodiment shown in FIG. 4 or FIG. 6, for example, S101, S102, S104, S201, S202, and S204, and/or configured to support another process of the technology in this specification.

In addition, the transceiver module 820 may be one function module. The function module can complete both a sending operation and a receiving operation. For example, the transceiver module 820 may be configured to perform all sending operations and receiving operations performed by the terminal device in the embodiment shown in FIG. 4 or FIG. 6. For example, when performing the sending operations, the transceiver module 820 may be considered as a sending module; and when performing the receiving operations, the transceiver module 820 may be considered as a receiving module. Alternatively, the transceiver module 820 may be two function modules. The transceiver module 820 may be considered as a general term of the two function modules. The two function modules are a sending module and a receiving module. The sending module is configured to complete a sending operation. For example, the sending module may be configured to perform all sending operations performed by the terminal device in the embodiment shown in FIG. 4 or FIG. 6. The receiving module is configured to complete a receiving operation. For example, the receiving module may be configured to perform all receiving operations performed by the terminal device in the embodiment in FIG. 4 or FIG. 6.

When the method shown in FIG. 4 is performed, the transceiver module 820 may be configured to send uplink pilot signals to a network device, and receive downlink pilot signals from the network device. The processing module 810 may be configured to determine a first delay information set based on the downlink pilot signals, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$ ; or a delay position of each of $N_p$ paths of the downlink channel corresponding to the $p^{th}$ piece of first delay information. The transceiver module 820 may further send the first delay information set to the network device. In an embodiment, the first delay information set is for uplink channel estimation.

In an embodiment, P is a positive integer less than or equal to M×K , p=1, 2, . . . , or P, M represents a quantity of send ports of the network device, and K represents a quantity of receive ports of the terminal device.

In an embodiment, the first delay information set is carried by using downlink channel state information.

In an embodiment, the transceiver module 820 may further receive second delay information from the network device, where the second delay information indicates: a quantity T of paths of an uplink channel between K' send ports of the terminal device and M' receive ports of the network device, where T is a positive integer; and/or a delay position of each of the T paths of the uplink channel between the K' send ports of the terminal device and the M' receive ports of the network device. In this case, the processing module 810 may determine the first delay information set based on the downlink pilot signals and the second delay information. Therefore, the first delay information set is determined more efficiently.

In an embodiment, the delay positions of the $N_p$ paths in the $p^{th}$ piece of first delay information is a subset of the delay positions of the T paths, $N_p \le T$, and the $p^{th}$ piece of first delay information indicates indexes of the delay positions of the $N_p$ paths in the delay positions of the T paths, to reduce overheads.

In an embodiment, the transceiver module 820 may further receive first information from the network device, where the first information indicates frequency domain positions of the downlink pilot signals, and the frequency domain positions of the downlink pilot signals are distributed at unequal intervals, so that uplink channel estimation accuracy can be further improved.

In an embodiment, the processing module 810 may be configured to determine frequency domain positions of the downlink pilot signals based on the second delay information.

In an embodiment, the transceiver module 820 may further receive second information from the network device, where the second information indicates the terminal device to send the first delay information set.

In an embodiment, the second information further indicates the terminal device to receive the second delay information.

When the method shown in FIG. 6 is performed, the transceiver module 820 may send uplink pilot signals of a first component carrier to a network device, and receive, from the network device, downlink pilot signals of a second component carrier to an $F^{th}$ component carrier, where F is a positive integer greater than or equal to 2, and the first component carrier is one of the second component carrier to the $F^{th}$ component carrier. The processing module 810 may determine third delay information based on the downlink pilot signals, where the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The transceiver module 820 may further send the third delay information to the network device.

In an embodiment, the processing module 810 may determine the third delay information based on the uplink pilot signals and the downlink pilot signals.

In an embodiment, the processing module 810 may determine $R_2$ delay positions of the downlink channel based on the downlink pilot signals of the second component carrier to the $F^{th}$ component carrier, where $R_2$ is a positive integer greater than or equal to $R_1$. The processing module 810 may select the $R_1$ delay positions from the $R_2$ delay positions of the downlink channel based on a position of a frequency domain resource for sending the uplink pilot signals of the first component carrier. The processing module 810 may determine the third delay information based on the $R_1$ delay positions. According to this design, estimation accuracy can be further improved.

In an embodiment, the third delay information is carried by using downlink channel state information.

In an embodiment, the transceiver module 820 may further receive fourth information from the network device, where the fourth information indicates the terminal device to send the third delay information to the network device.

Figure 9:
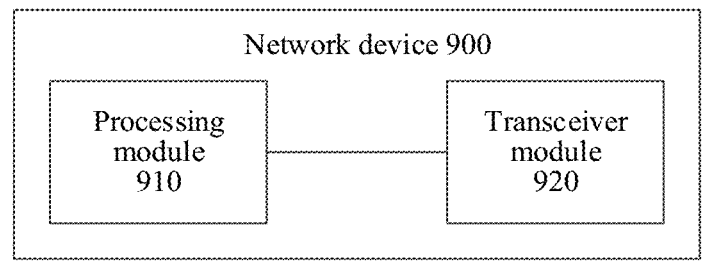
FIG. 9 is a schematic diagram of a structure of another communication apparatus according to an embodiment of this application.

FIG. 9 is a schematic block diagram of another communication apparatus according to an embodiment of this application. For example, the communication apparatus is a network device 900.

The network device 900 may include a processing module 910 and a transceiver module 920. For example, the network device 900 may be a network device, or may be a chip used in the network device or another combined device or a component that has a function of the network device. When the network device 900 is the network device, the transceiver module 920 may be a transceiver, where the transceiver may include an antenna, a radio frequency circuit, and the like; and the processing module 910 may be a processor, where the processor may include one or more CPUs. When the network device 900 is the component that has the function of the network device, the transceiver module 920 may be a radio frequency unit, and the processing module 910 may be a processor, for example, a baseband processor. When the network device 900 is a chip system, the transceiver module 920 may be an input/output interface of a chip (for example, a baseband chip), and the processing module 910 may be a processor of the chip system, and may include one or more central processing units. It should be understood that the processing module 910 in an embodiment of the application may be implemented by a processor or a processor-related circuit component, and the transceiver module 920 may be implemented by a transceiver or a transceiver-related circuit component.

For example, the processing module 910 may be configured to perform all operations performed by the network device in the embodiment shown in FIG. 4 or FIG. 6 except receiving and sending operations, for example, perform S105, for another example, generate a message, information, and/or signaling sent by the transceiver module 920, and/or process a message, information, and/or signaling received by the transceiver module 920, and/or configured to support another process of the technology in this specification. The transceiver module 920 may be configured to perform all sending and/or receiving operations performed by the network device in the embodiment shown in FIG. 4 or FIG. 6, for example, S101, S102, S104, S201, S202, and S204, and/or configured to support another process of the technology in this specification.

In addition, the transceiver module 920 may be one function module. The function module can complete both a sending operation and a receiving operation. For example, the transceiver module 920 may be configured to perform all sending operations and receiving operations performed by the network device in the embodiment shown in FIG. 4 or FIG. 6. For example, when performing the sending operations, the transceiver module 920 may be considered as a sending module; and when performing the receiving operations, the transceiver module 920 may be considered as a receiving module. Alternatively, the transceiver module 920 may be two function modules. The transceiver module 920 may be considered as a general term of the two function modules. The two function modules are a sending module and a receiving module. The sending module is configured to complete a sending operation. For example, the sending module may be configured to perform all sending operations performed by the network device in the embodiment shown in FIG. 4 or FIG. 6. The receiving module is configured to complete a receiving operation. For example, the receiving module may be configured to perform all receiving operations performed by the network device in the embodiment shown in FIG. 4 or FIG. 6.

When the method shown in FIG. 4 is performed, the transceiver module 920 may receive uplink pilot signals from a terminal device, send downlink pilot signals to the terminal device, and receive a first delay information set from the terminal device, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The processing module 910 may determine an uplink channel between K' send ports of the terminal device and M' receive ports of the network device based on the first delay information set and the uplink pilot signals.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the transceiver module 920 may further send second delay information to the terminal device, where the second delay information indicates: a quantity T of paths of the uplink channel between the K' send ports of the terminal device and the M' receive ports of the network device, where T is a positive integer; and/or a delay position of each of the T paths of the uplink channel between the K' send ports of the terminal device and the M' receive ports of the network device.

In an embodiment, the delay positions of the $N_p$ paths in the $p^{th}$ piece of first delay information is a subset of the delay positions of the T paths, $N_p \leq T$, and the $p^{th}$ piece of first delay information indicates indexes of the delay positions of the $N_p$ paths in the delay positions of the T paths.

In an embodiment, the transceiver module 920 may further send first information to the terminal device, where the first information indicates frequency domain positions of the downlink pilot signals, and the frequency domain positions of the downlink pilot signals are distributed at unequal intervals.

In an embodiment, the transceiver module 920 may further send second information to the terminal device, where the second information indicates the terminal device to send the first delay information set.

In an embodiment, the second signaling further indicates the terminal device to receive the second delay information.

When the method shown in FIG. 6 is performed, the transceiver module 920 may receive, from a terminal device, uplink pilot signals of a first component carrier, and send, to the terminal device, downlink pilot signals of a second component carrier to an $F^{th}$ component carrier, where F is a positive integer greater than or equal to 2, and the first component carrier is one of the second component carrier to the $F^{th}$ component carrier. The transceiver module 920 may further receive third delay information from the terminal device, where the third delay information is determined based on the downlink pilot signals, the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The processing module 910 may determine, based on the third delay information and the uplink pilot signals, an uplink channel that is between K' send ports of the terminal device and M' receive ports of the network device and that is on the second component carrier to the $F^{th}$ component carrier.

In an embodiment, the third delay information is carried by using downlink channel state information.

In an embodiment, the transceiver module 920 may send fourth information to the terminal device, where the fourth information indicates the terminal device to send the third delay information to the network device.

An embodiment of this application further provides a communication apparatus. The communication apparatus may be a terminal device, or may be a circuit. The communication apparatus may be configured to perform an action performed by the terminal device in the foregoing method embodiments.

Figure 10:
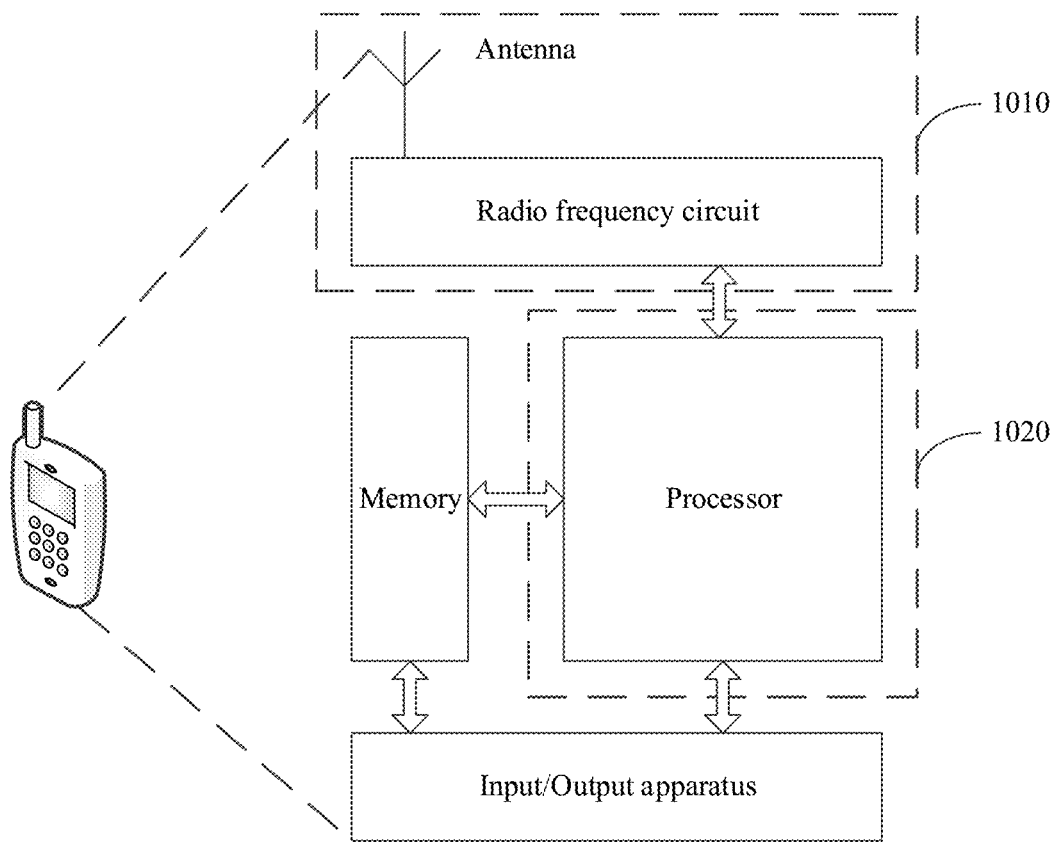
FIG. 10 is a schematic diagram of a structure of another communication apparatus according to an embodiment of this application.

When the communication apparatus is the terminal device, FIG. 10 is a simplified schematic diagram of a structure of a terminal device. For ease of understanding and convenience of figure illustration, an example in which the terminal device is a mobile phone is used in FIG. 10. As shown in FIG. 10, the terminal device includes a processor a memory, a radio frequency circuit, an antenna, and an input/output apparatus. The processor is mainly configured to: process a communication protocol and communication data, control the terminal device, execute a software program, process data of the software program, and the like.

The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in an embodiment of the application.

In an embodiment of the application, the antenna and the radio frequency circuit that have receiving and sending functions may be considered as a transceiver unit of the terminal device (where the transceiver unit may be one function unit, and the function unit can implement a sending function and a receiving function; or the transceiver unit may include two function units: a receiving unit that can implement a receiving function and a sending unit that can implement a sending function), and the processor that has a processing function is considered as a processing unit of the terminal device. As shown in FIG. 10, the terminal device includes a transceiver unit 1010 and a processing unit 1020. The transceiver unit may also be referred to as a transceiver, a transceiver apparatus, or the like. The processing unit may also be referred to as a processor, a processing board, a processing module, a processing apparatus, or the like. In an embodiment, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 1010 is configured to perform a sending operation and a receiving operation of the terminal device in the foregoing method embodiments, and the processing unit 1020 is configured to perform an operation other than the receiving operation and the sending operation of the terminal device in the foregoing method embodiments.

For example, in an embodiment, the processing unit 1020 may be configured to perform all operations, for example, S103, performed by the terminal device in the embodiment shown in FIG. 4 or FIG. 6 except receiving and sending operations, and/or configured to support another process of the technology in this specification, for example, generate a message, information, and/or signaling sent by the transceiver unit 1010, and process a message, information, and/or signaling received by the transceiver module 1020. The transceiver unit 1010 may be configured to perform all receiving and sending operations performed by the terminal device in the embodiment shown in FIG. 4 or FIG. 6, for example, S101, S102, S104, S201, S202, and S204, and/or configured to support another process of the technology in this specification.

For example, the processing unit 1020 may perform an action similar to that performed by the processing module 810. In other words, the processing module 1020 includes the processing module 810. The transceiver unit 1010 may perform an action similar to that performed by the transceiver module 820. In other words, the transceiver unit 1010 includes the transceiver module 820.

When the communication apparatus is a chip-type apparatus or the circuit, the apparatus may include a transceiver unit and a processing unit. The transceiver unit may be an input/output circuit and/or a communication interface. The processing unit is an integrated processor, a microprocessor, or an integrated circuit.

In an embodiment, when the method shown in FIG. 4 is performed, the transceiver unit 1010 may be configured to send uplink pilot signals to a network device, and receive downlink pilot signals from the network device. The processing unit 1020 may be configured to determine a first delay information set based on the downlink pilot signals, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The transceiver unit 1010 may further send the first delay information set to the network device. In an embodiment, the first delay information set is for uplink channel estimation.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the transceiver unit 1010 may further receive second delay information from the network device, where the second delay information indicates: a quantity T of paths of an uplink channel between K' send ports of the terminal device and M' receive ports of the network device, where T is a positive integer; and/or a delay position of each of the T paths of the uplink channel between the K' send ports of the terminal device and the M' receive ports of the network device. In this case, the processing unit 1020 may determine the first delay information set based on the downlink pilot signals and the second delay information. Therefore, the first delay information set is determined more efficiently.

In an embodiment, the delay positions of the $N_p$ paths in the $p^{th}$ piece of first delay information is a subset of the delay positions of the T paths, $N_p \leq T$, and the $p^{th}$ piece of first delay information indicates indexes of the delay positions of the $N_p$ paths in the delay positions of the T paths, to reduce overheads.

In an embodiment, the transceiver unit 1010 may further receive first information from the network device, where the first information indicates frequency domain positions of the downlink pilot signals, and the frequency domain positions of the downlink pilot signals are distributed at unequal intervals, so that uplink channel estimation accuracy can be further improved.

In an embodiment, the processing unit 1020 may be configured to determine frequency domain positions of the downlink pilot signals based on the second delay information.

In an embodiment, the transceiver unit 1010 may further receive second information from the network device, where the second information indicates the terminal device to send the first delay information set.

In an embodiment, the second information further indicates the terminal device to receive the second delay information.

When the method shown in FIG. 6 is performed, the transceiver unit 1010 may send uplink pilot signals of a first component carrier to a network device, and receive, from the network device, downlink pilot signals of a second component carrier to an $F^{th}$ component carrier, where F is a positive integer greater than or equal to 2, and the first component carrier is one of the second component carrier to the $F^{th}$ component carrier. The processing unit 1020 may determine third delay information based on the downlink pilot signals, where the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The transceiver unit 1010 may further send the third delay information to the network device.

In an embodiment, the processing unit 1020 may determine the third delay information based on the uplink pilot signals and the downlink pilot signals.

In an embodiment, the processing unit 1020 may determine $R_2$ delay positions of the downlink channel based on the downlink pilot signals of the second component carrier to the $F^{th}$ component carrier, where $R_2$ is a positive integer greater than or equal to $R_1$. The processing unit 1020 may select the $R_1$ delay positions from the $R_2$ delay positions of the downlink channel based on a position of a frequency domain resource for sending the uplink pilot signals of the first component carrier. The processing unit 1020 may determine the third delay information based on the $R_1$ delay positions. According to this design, estimation accuracy can be further improved.

In an embodiment, the third delay information is carried by using downlink channel state information.

In an embodiment, the transceiver unit 1010 may further receive fourth information from the network device, where the fourth information indicates the terminal device to send the third delay information to the network device.

Figure 11:
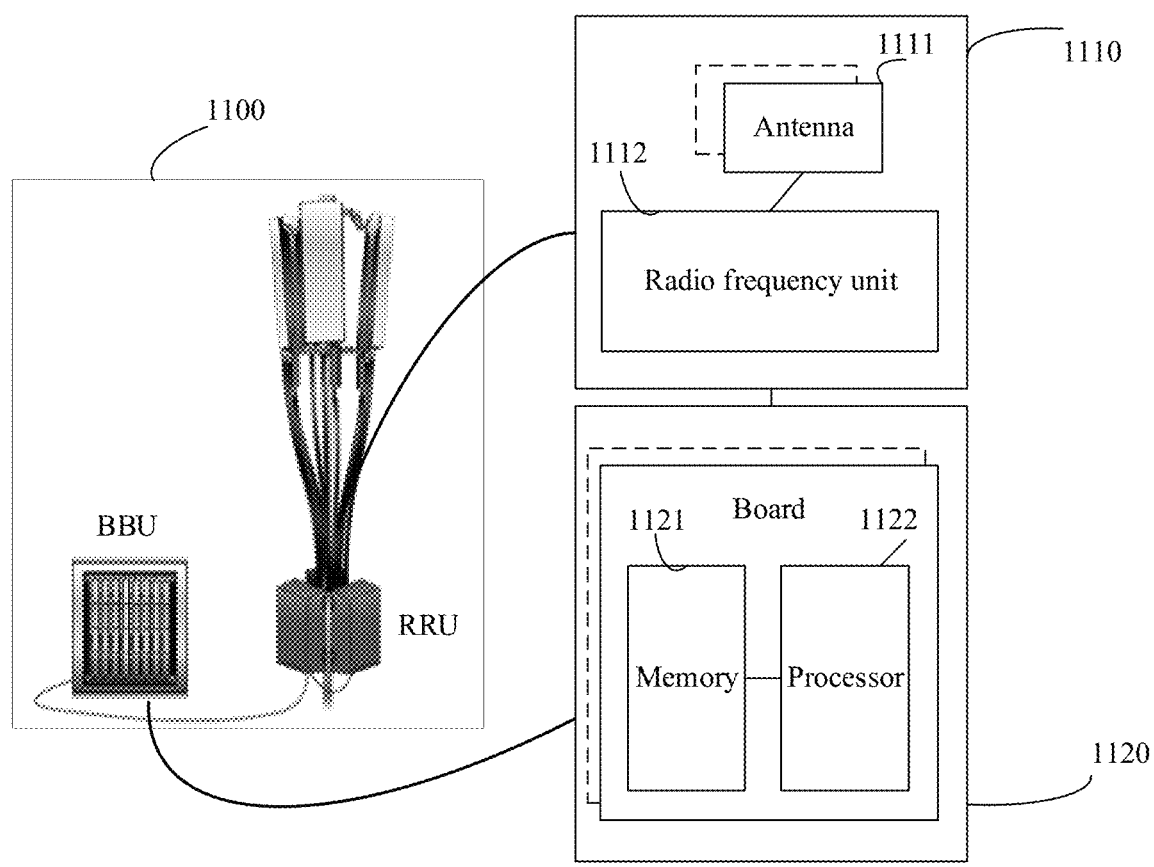
FIG. 11 is a schematic diagram of a structure of another communication apparatus according to an embodiment of this application.

When an apparatus in embodiments of this application is a network device, the apparatus may be shown in FIG. 11. The apparatus 1100 includes one or more radio frequency units such as a remote radio unit (RRU) 1110 and one or more baseband units (BBUs) (which may also be referred to as digital units, DUs) 1120. The RRU 1110 may be referred to as a transceiver module. The transceiver module may include a sending module and a receiving module, or the transceiver module may be a module that can implement a sending function and a receiving function. The transceiver module may correspond to the transceiver module 920 in FIG. 9. That is, the transceiver module may perform an action performed by the transceiver module 920. In an embodiment, the transceiver module may also be referred to as a transceiver, a transceiver circuit, or the like, and may include at least one antenna 1111 and a radio frequency unit 1112. The RRU 1110 is mainly configured to send and receive a radio frequency signal, and perform conversion between the radio frequency signal and a baseband signal. For example, the RRU 1110 is configured to send indication information to a terminal device. The BBU 1110 is mainly configured to perform baseband processing, control a base station, and so on. The RRU 1110 and the BBU 1120 may be physically disposed together, or may be physically separated, that is, the base station is a distributed base station.

The BBU 1120 is a control center of the base station, or may be referred to as a processing module. The BBU 1120 may correspond to the processing module 910 in FIG. 9, and is mainly configured to implement a baseband processing function, for example, channel coding, multiplexing, modulation, or spreading. In addition, an action performed by the processing module 910 may be performed by the processing module. For example, the BBU (the processing module) may be configured to control the base station to perform an operation procedure related to the network device in the foregoing method embodiments, for example, perform S302, or generate the first configuration and at least one second configuration corresponding to the first configuration, first information, or third information.

In an example, the BBU 1120 may include one or more boards, and a plurality of boards may jointly support a radio access network (for example, an LTE network) having a single access standard, or may separately support radio access networks (for example, the LTE network, a 5G network, or another network) having different access standards. The BBU 1120 further includes a memory 1121 and a processor 1122. The memory 1121 is configured to store necessary instructions and data. The processor 1122 is configured to control the base station to perform a necessary action, for example, is configured to control the base station to perform the operation procedure related to the network device in the foregoing method embodiments. The memory 1121 and the processor 1122 may serve one or more boards. In other words, the memory and the processor may be separately disposed on each board. Alternatively, the plurality of boards may share a same memory and processor. In addition, a necessary circuit may be further disposed on each board.

For example, the BBU 1120 may be configured to perform all operations performed by the network device in the embodiment shown in FIG. 4 or FIG. 6 except receiving and sending operations, for example, perform S105, for another example, generate a message, information, and/or signaling sent by the RRU 1110, and/or process a message, information, and/or signaling received by the RRU 1110, and/or configured to support another process of the technology in this specification. The RRU 1110 may be configured to perform all sending and/or receiving operations performed by the network device in the embodiment shown in FIG. 4 or FIG. 6, for example, S101, S102, S104, S201, S202, and S204, and/or configured to support another process of the technology in this specification.

When the method shown in FIG. 4 is performed, the RRU 1110 may receive uplink pilot signals from a terminal device, send downlink pilot signals to the terminal device, and receive a first delay information set from the terminal device, where the first delay information set includes P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of the following: a quantity $N_p$ of paths of the downlink channel corresponding to the $p^{th}$ piece of first delay information, where $N_p$ is a positive integer; a delay gain of each of L paths in $N_p$ paths, where L is a positive integer less than or equal to $N_p$; or a delay position of each of $N_p$ paths of the downlink channel corresponding to the $p^{th}$ piece of first delay information. The BBU 1120 may determine an uplink channel between K' send ports of the terminal device and M' receive ports of the network device based on the first delay information set and the uplink pilot signals.

In an embodiment, P is a positive integer less than or equal to M×K, p=1, 2, . . . , or P, M represents a quantity of send ports of the network device, and K represents a quantity of receive ports of the terminal device.

In an embodiment, the first delay information set is carried by using downlink channel state information.

In an embodiment, the RRU 1110 may further send second delay information to the terminal device, where the second delay information indicates: a quantity T of paths of the uplink channel between the K' send ports of the terminal device and the M' receive ports of the network device, where T is a positive integer; and/or a delay position of each of the T paths of the uplink channel between the K' send ports of the terminal device and the M' receive ports of the network device.

In an embodiment, the delay positions of the $N_p$ paths in the $p^{th}$ piece of first delay information is a subset of the delay positions of the T paths, $N_p \leq T$, and the $p^{th}$ piece of first delay information indicates indexes of the delay positions of the $N_p$ paths in the delay positions of the T paths.

In an embodiment, the RRU 1110 may further send first information to the terminal device, where the first information indicates frequency domain positions of the downlink pilot signals, and the frequency domain positions of the downlink pilot signals are distributed at unequal intervals.

In an embodiment, the RRU 1110 may further send second information to the terminal device, where the second information indicates the terminal device to send the first delay information set.

In an embodiment, the second signaling further indicates the terminal device to receive the second delay information.

When the method shown in FIG. 6 is performed, the RRU 1110 may receive, from a terminal device, uplink pilot signals of a first component carrier, and send, to the terminal device, downlink pilot signals of a second component carrier to an $F^{th}$ component carrier, where F is a positive integer greater than or equal to 2, and the first component carrier is one of the second component carrier to the $F^{th}$ component carrier. The RRU 1110 may further receive third delay information from the terminal device, where the third delay information is determined based on the downlink pilot signals, the third delay information is related to a downlink channel that is between M send ports of the network device and K receive ports of the terminal device and that is on the second component carrier to the $F^{th}$ component carrier, and the third delay information indicates: a quantity $R_1$ of paths of the downlink channel, where $R_1$ is a positive integer; and/or a delay position of each of the $R_1$ paths of the downlink channel. The BBU 1120 may determine, based on the third delay information and the uplink pilot signals, an uplink channel that is between K' send ports of the terminal device and M' receive ports of the network device and that is on the second component carrier to the $F^{th}$ component carrier.

In an embodiment, the third delay information is carried by using downlink channel state information.

In an embodiment, the RRU 1110 may send fourth information to the terminal device, where the fourth information indicates the terminal device to send the third delay information to the network device.

An embodiment of this application provides a communication system. The communication system may include the terminal device in the embodiment shown in FIG. 1 and the network device in the embodiment shown in FIG. 1. In an embodiment, the terminal device and the network device in the communication system may perform the communication method in FIG. 4 or FIG. 6.

An embodiment of this application further provides a computer-readable storage medium. The computer-readable storage medium stores a computer program. When the computer program is executed by a computer, the computer may implement a procedure related to the terminal device in the embodiment shown in FIG. 4 or FIG. 6 provided in the foregoing method embodiments.

An embodiment of this application further provides a computer-readable storage medium. The computer-readable storage medium is configured to store a computer program. When the computer program is executed by a computer, the computer may implement a procedure related to the network device in the embodiment shown in FIG. 4 or FIG. 6 provided in the foregoing method embodiments.

An embodiment of this application further provides a computer program product. The computer program product is configured to store a computer program. When the computer program is executed by a computer, the computer may implement a procedure related to the network device in the embodiment shown in FIG. 4 or FIG. 6 provided in the foregoing method embodiments.

An embodiment of this application further provides a computer program product. The computer program product is configured to store a computer program. When the computer program is executed by a computer, the computer may implement a procedure related to the terminal device in the embodiment shown in FIG. 4 or FIG. 6 provided in the foregoing method embodiments.

An embodiment of this application further provides a chip or a chip system. The chip may include a processor. The processor may be configured to invoke a program or instructions in a memory, to perform a procedure related to the terminal device in the embodiment shown in FIG. 4 or FIG. 6 provided in the foregoing method embodiments. The chip system may include the chip, and may further include another component such as the memory or a transceiver.

An embodiment of this application further provides a chip or a chip system. The chip may include a processor. The processor may be configured to invoke a program or instructions in a memory, to perform a procedure related to the network device in the embodiment shown in FIG. 4 or FIG. 6 provided in the foregoing method embodiments. The chip system may include the chip, and may further include another component such as the memory or a transceiver.

It should be understood that the processor mentioned in embodiments of this application may be a CPU, or may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory in this specification aims to include but is not limited to these memories and any memory of another appropriate type.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

One of ordinary skilled in the art may be aware that, in combination with the examples described in embodiments disclosed in this specification, units and algorithm operations can be implemented by electronic hardware or a combination of computer software and electronic hardware. Whether the functions are performed by hardware or software depends on particular applications and design constraints of the technical solutions. One of ordinary skilled in the art may use different methods to implement the functions for all particular applications, but it should not be considered that the implementation goes beyond the scope of this application.

It may be clearly understood by one of ordinary skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods in embodiments of this application. The foregoing computer-readable storage medium may be any available medium that can be accessed by a computer. By way of example but not limitation, the computer-readable medium may include a random access memory (RAM), a read-only memory (ROM), an electrically erasable programmable read only memory (EEPROM), a compact disc read-only memory (CD-ROM), a universal serial bus flash disk, a removable hard disk or another compact disc storage, a magnetic disk storage medium or another magnetic storage device, or any other medium that can be for carrying or storing expected program code in a form of instructions or a data structure and that can be accessed by a computer.

The foregoing descriptions are merely implementations of this application, but the protection scope of embodiments of this application is not limited thereto. Any variation or replacement readily figured out by one of ordinary skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
   sending, by a terminal device, uplink pilot signals to a network device;
   receiving, by the terminal device, downlink pilot signals from the network device;
   determining, by the terminal device, a first delay information set based on the downlink pilot signals, wherein the first delay information set comprises P pieces of first delay information, wherein a $p^{th}$ piece of first delay information in the P pieces of first delay information is related to a downlink channel between the network device and the terminal device, wherein the downlink channel related to the $p^{th}$ piece of first delay information is a downlink channel between a send port of the network device and a receive port of the terminal device, and wherein the $p^{th}$ piece of first delay information indicates at least one of: a quantity $N_p$ of paths of the downlink channel corresponding to the $p^{th}$ piece of first delay information, wherein $N_p$ is a positive integer; a delay gain of each of L paths in $N_p$ paths, wherein L is a positive integer less than or equal to $N_p$; or a delay position of each of $N_p$ paths of the downlink channel corresponding to the $p^{th}$ piece of first delay information wherein P is a positive integer less than or equal to M×K, P=1, 2 . . . , or P, M represents a quantity of send ports of the network device, and K represents a quantity of receive ports of the terminal device; and
   sending, by the terminal device, the first delay information set to the network device.

2. The method according to claim 1, wherein the first delay information set is carried by using downlink channel state information.

3. The method according to claim 1, further comprising:
   receiving, by the terminal device, second delay information from the network device, wherein the second delay information indicates:
   a quantity T of paths of an uplink channel between K' send ports of the terminal device and M' receive ports of the network device, wherein T is a positive integer; and/or
   a delay position of each of the T paths of the uplink channel between the K' send ports of the terminal device and the M' receive ports of the network device P, wherein M' represents a quantity of receive ports of the network device, and K' represents a quantity of send ports of the terminal device; and
   wherein the determining the first delay information set based on the downlink pilot signals comprises:
   determining, by the terminal device, the first delay information set based on the downlink pilot signals and the second delay information.

4. The method according to claim 3, wherein delay positions of the $N_p$ paths in the $p^{th}$ piece of first delay information is a subset of the delay positions of the T paths, $N_p \le T$, and wherein the $p^{th}$ piece of first delay information indicates indexes of the delay positions of the $N_p$ paths in the delay positions of the T paths.

5. The method according to claim 1, wherein the terminal device receives first information from the network device, wherein the first information indicates frequency domain positions of the downlink pilot signals, and wherein the frequency domain positions of the downlink pilot signals are distributed at unequal intervals.

6. The method according to claim 3, wherein the terminal device determines frequency domain positions of the downlink pilot signals based on the second delay information.

7. The method according to claim 1, further comprising:
   receiving, by the terminal device, second information from the network device, wherein the second information indicates the terminal device to send the first delay information set.

8. The method according to claim 7, wherein the second information further indicates the terminal device to receive second delay information.

9. A communication method, comprising:
   receiving, by a network device, uplink pilot signals from a terminal device;
   sending, by the network device, downlink pilot signals to the terminal device;
   receiving, by the network device, a first delay information set from the terminal device,
   the first delay information set comprises P pieces of first delay information, a $p^{th}$ piece of first delay information in the P pieces of first delay information is related to a downlink channel between the network device and the terminal device, the downlink channel related to the $p^{th}$ piece of first delay information is a downlink channel between a send port of the network device and a receive port of the terminal device, and the $p^{th}$ piece of first delay information indicates at least one of: a quantity $N_p$ of paths of the downlink channel corresponding to the $p^{th}$ piece of first delay information, wherein $N_p$ a positive integer; a delay gain of each of L paths $N_p$ paths, wherein L is a positive integer less than or equal to $N_p$; or a delay position of each of $N_p$ paths of the downlink channel corresponding to the $p^{th}$ piece of first delay information wherein P is a positive integer less than or equal to M×K, P=1, 2 . . . or P, M represents a quantity of send ports of the network device, and K represents a quantity of receive ports of the terminal device; and
   determining, by the network device, an uplink channel between K' send ports of the terminal device and M' receive ports of the network device based on the first delay information set and the uplink pilot signals, wherein M' represents a quantity of receive ports of the network device, and K' represents a quantity of send ports of the terminal device.

10. The method according to claim 9, wherein the first delay information set is carried by using downlink channel state information.

11. The method according to claim 9, further comprising:
    sending, by the network device, second delay information to the terminal device, wherein the second delay information indicates:
    a quantity T of paths of the uplink channel between the K' send ports of the terminal device and the M' receive ports of the network device, wherein T is a positive integer; and/or a delay position of each of the T paths of the uplink channel between the K' send ports of the terminal device and the M' receive ports of the network device.

12. The method according to claim 11, wherein delay positions of the $N_p$ paths in the $p^{th}$ piece of first delay information is a subset of the delay positions of the T paths, $N_p \le T$, and wherein the $p^{th}$ piece of first delay information indicates indexes of the delay positions of the $N_p$ paths in the delay positions of the T paths.

13. The method according to claim 9, wherein the network device sends first information to the terminal device, wherein the first information indicates frequency domain positions of the downlink pilot signals, and wherein the frequency domain positions of the downlink pilot signals are distributed at unequal intervals.

14. The method according to claim 9, further comprising:
sending, by the network device, second information to the terminal device, wherein the second information indicates the terminal device to send the first delay information set.

15. The method according to claim 14, wherein the second information further indicates the terminal device to receive second delay information.

16. A communication method, comprising:
sending, by a terminal device, uplink pilot signals of a first component carrier to a network device;
receiving, by the terminal device from the network device, downlink pilot signals of a second component carrier to an $F^{th}$ component carrier, wherein F is a positive integer greater than or equal to 2, and wherein the first component carrier is one of the second component carrier to the $F^{th}$ component carrier;
determining, by the terminal device, third delay information based on the downlink pilot signals, wherein the third delay information is related to a downlink channel between M send ports of the network device and K receive ports of the terminal device on the second component carrier to the $F^{th}$ component carrier, and wherein the third delay information indicates: a quantity $R_1$ of paths of the downlink channel, wherein $R_1$ is a positive integer; and/or a delay position of each of the $R_1$ paths of the downlink channel, wherein M represents a quantity of send ports of the network device, and K represents a quantity of receive ports of the terminal device; and
sending, by the terminal device, the third delay information to the network device.

17. The method according to claim 16, wherein the determining third delay information based on the downlink pilot signals comprises:
determining, by the terminal device, the third delay information based on the uplink pilot signals and the downlink pilot signals.

18. The method according to claim 17, wherein the determining the third delay information based on the uplink pilot signals and the downlink pilot signals comprises:
determining, by the terminal device, $R_2$ delay positions of the downlink channel based on the downlink pilot signals of the second component carrier to the $F^{th}$ component carrier, wherein $R_2$ is a positive integer greater than or equal to $R_1$;
selecting, by the terminal device, the $R_1$ delay positions from the $R_2$ delay positions of the downlink channel based on a position of a frequency domain resource for sending the uplink pilot signals of the first component carrier; and
determining, by the terminal device, the third delay information based on the $R_1$ delay positions.

* * * * *